US010719521B2

(12) United States Patent
Zhang et al.

(10) Patent No.: US 10,719,521 B2
(45) Date of Patent: Jul. 21, 2020

(54) EVALUATING MODELS THAT RELY ON AGGREGATE HISTORICAL DATA

(71) Applicant: Google Inc., Mountain View, CA (US)

(72) Inventors: Stephanie Zhang, Jersey City, NJ (US); Jon Vaver, Lafayette, CO (US)

(73) Assignee: Google LLC, Mountain View, CA (US)

(*) Notice: Subject to any disclaimer, the term of this patent is extended or adjusted under 35 U.S.C. 154(b) by 293 days.

(21) Appl. No.: 15/707,594

(22) Filed: Sep. 18, 2017

(65) Prior Publication Data

US 2019/0087469 A1   Mar. 21, 2019

(51) Int. Cl.
*G06G 7/00* (2006.01)
*G06F 16/2458* (2019.01)
*G06F 17/18* (2006.01)
*G06Q 30/02* (2012.01)
*G06F 16/242* (2019.01)
*G06F 17/16* (2006.01)

(52) U.S. Cl.
CPC ........ *G06F 16/2465* (2019.01); *G06F 16/244* (2019.01); *G06F 17/18* (2013.01); *G06Q 30/02* (2013.01); *G06Q 30/0201* (2013.01); *G06F 17/16* (2013.01)

(58) Field of Classification Search
CPC ............ G06F 16/2465; G06F 30/0201; G06F 16/244; G06F 17/18; G06F 17/16; G06F 11/3457; G06F 11/3461; G06F 17/5009
USPC ................................ 707/722, 808, 809, 810
See application file for complete search history.

(56) References Cited

U.S. PATENT DOCUMENTS

| | | | |
|---|---|---|---|
| 8,082,141 B2 * | 12/2011 | Hodgson | G06F 17/5022 703/21 |
| 9,715,695 B2 * | 7/2017 | de Souza | G06N 7/005 |
| 9,922,340 B1 * | 3/2018 | Vaver | G06Q 30/0242 |
| 10,387,894 B2 * | 8/2019 | Akkiraju | G06Q 30/0251 |

(Continued)

FOREIGN PATENT DOCUMENTS

EP      2 963 608 A1    6/2016

OTHER PUBLICATIONS

International Search Report related to PCT/US2018/022467 dated May 8, 2018.

(Continued)

*Primary Examiner* — Mohammed R Uddin
(74) *Attorney, Agent, or Firm* — Foley & Lardner LLP

(57) ABSTRACT

Systems and methods for model validation includes generating a first and a second time series of segmentation states for a data set representative of a simulated population, e.g., a collection of membership counts corresponding to respective segments of the simulated population. The first and second time series of segmentation states are generated by respectively processing the data set through a first and a second simulation each comprising iterative application of a plurality of event functions. The first and the second simulation differ in at least one capacity, e.g., one including a first event function configured with a first parameter, and the second not. Analysis of differences between the first and second time series may be compared to analysis of one of the time series using a subject model. The comparison is then used to validate the model or demonstrate accuracies, inaccuracies, and/or model bias with respect to a performance metric.

20 Claims, 11 Drawing Sheets

(56) References Cited

U.S. PATENT DOCUMENTS

| | | | |
|---|---|---|---|
| 2002/0169658 A1* | 11/2002 | Adler | G06Q 10/06 705/7.28 |
| 2003/0101449 A1* | 5/2003 | Bentolila | G06Q 30/0251 725/10 |
| 2009/0076995 A1* | 3/2009 | Uyama | G06Q 30/02 706/46 |
| 2010/0217650 A1 | 8/2010 | Hartnell | |
| 2011/0099101 A1* | 4/2011 | Emery | G06Q 40/02 705/38 |
| 2013/0304904 A1 | 11/2013 | Mouline et al. | |
| 2014/0214374 A1* | 7/2014 | Haas | G06F 17/5009 703/2 |
| 2015/0094996 A1* | 4/2015 | Barberis | G06F 17/5009 703/2 |
| 2015/0186925 A1* | 7/2015 | Chittilappilly | G06Q 30/0242 705/14.41 |
| 2017/0060982 A1* | 3/2017 | Akkiraju | G06F 16/285 |
| 2017/0178149 A1 | 6/2017 | Morimura et al. | |
| 2017/0195854 A1* | 7/2017 | Shi-Nash | H04W 4/029 |
| 2017/0300657 A1* | 10/2017 | Barrett | G16H 50/50 |

OTHER PUBLICATIONS

Written Opinion of the International Searching Authority related to PCT/US2018/022467 dated May 8, 2018.
International Preliminary Report on Patentability for PCT Appln. Ser. No. PCT/US2018/022467 dated Apr. 2, 2020 (8 pages).

* cited by examiner

372

374

EVALUATING MODELS THAT RELY ON AGGREGATE HISTORICAL DATA

BACKGROUND

Complex systems involving a large number of variables may be influenced by a variety of factors. Models have been developed to try to measure or quantify the impact of individual factors. However, these models can't control for the influence of additional factors. As a result, the validity or accuracy of these models, and the validity or accuracy of the valuations or predictions generated by these models, varies. These models are measurement tools that can be calibrated and tuned. In order to calibrate a measurement tool, the tool should be applied to a standard of known accuracy. However, for many complex systems, there is no known repeatable standard.

This problem is seen, for example, in models used to evaluate marketing strategies and identify how changes in a marketing strategies impact key performance indicators. Marketing models, such as media mix models ("MMM"), typically analyze aggregated historical data representing real world events that can't be recreated (e.g., because exterior variables are beyond the modeler's view or control). What is needed is a reliable market simulation that can establish a ground truth for evaluating marketing models that rely on aggregate historical data.

SUMMARY

Systems and methods are described for model validation. Systems and methods for model validation includes generating a first and a second time series of segmentation states for a data set representative of a simulated population, e.g., a collection of membership counts corresponding to respective segments of the simulated population. The first and second time series of segmentation states are generated by respectively processing the data set through a first and a second simulation each comprising iterative application of a plurality of event functions. The first and the second simulation differ in at least one capacity, e.g., one including a first event function configured with a first parameter, and the second not. Analysis of differences between the first and second time series may be compared to analysis of one of the time series using a subject model. The comparison is then used to validate the model or demonstrate accuracies, inaccuracies, and/or model bias with respect to a performance metric.

In at least one aspect, described is a method of model validation that includes generating a data set, by a data simulator comprising a processor, the data set representative of a simulated population, the data set comprising a collection of membership counts corresponding to respective segments of the simulated population in accordance with a segmentation scheme. The method includes generating a first time series of segmentation states by processing the data set through a first simulation comprising iterative application of a first plurality of event functions including a first event function configured with a first parameter, and generating a second time series of segmentation states by processing the data set through a second simulation comprising iterative application of a second plurality of event functions, wherein the second plurality of event functions does not include the first event function configured with the first parameter. The method includes identifying a first value for a performance metric, the first value representative of a difference between the first time series and the second time series. The method includes identifying, for a subject model, a second value for the performance metric, the second value representative of an output from application of the subject model to one of the first time series or the second first time series. The method then determines, by comparison of the first value to the second value, a validity score for the subject model with respect to the performance metric.

Following below are more detailed descriptions of various concepts related to, and implementations of, these and similar methods, apparatuses, and systems. The various concepts introduced above and discussed in greater detail below may be implemented in any of numerous ways, as the described concepts are not limited to any particular manner of implementation.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Figure 1A:
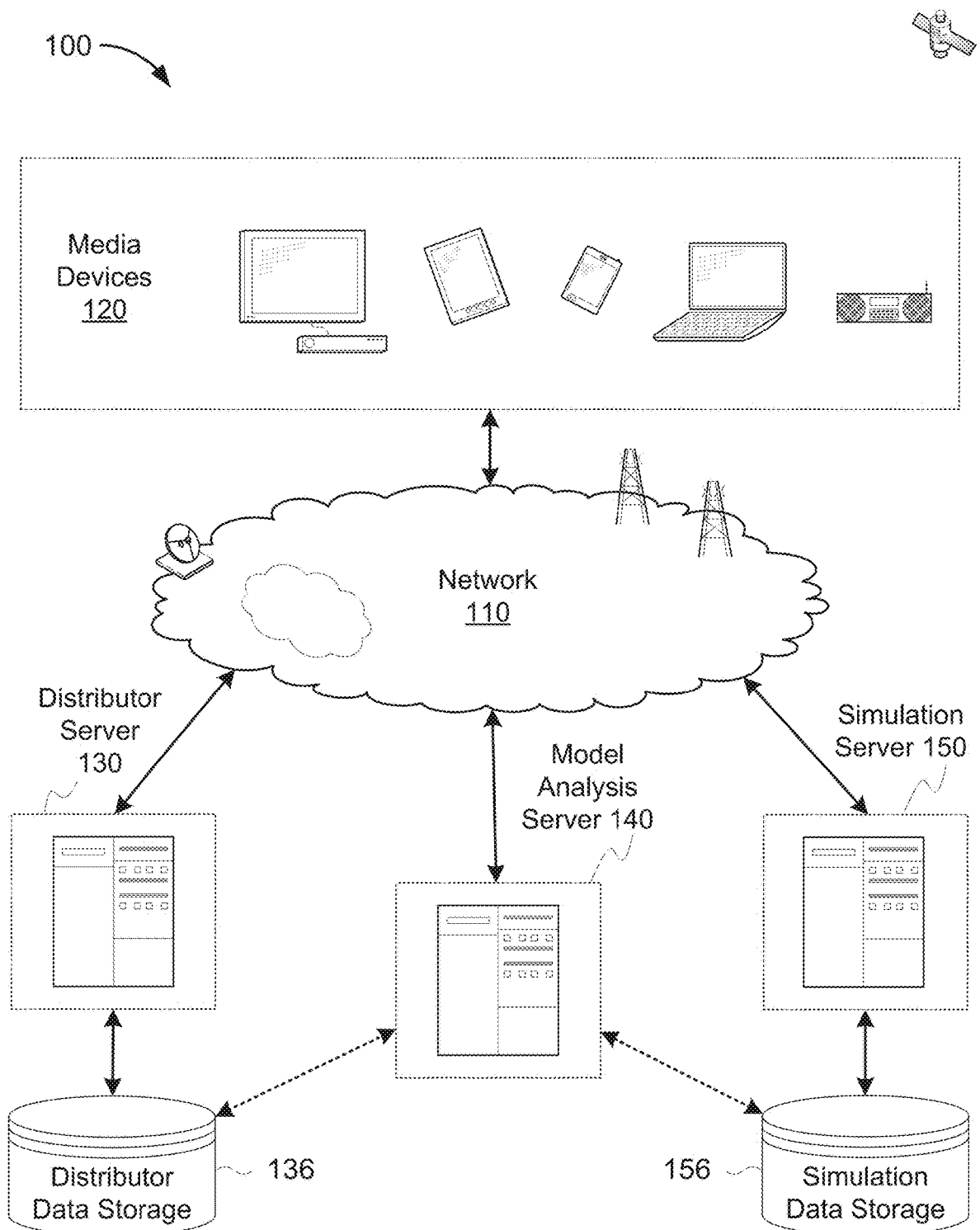
FIG. 1A is a block diagram illustrating an example computing environment suitable for use in the various implementations described herein.

Complex systems involving a large number of variables include, for example, weather prediction systems, market analysis systems, traffic predictions systems, elevator demand prediction systems, and so forth. In general, these (and other) complex systems may be influenced by a variety of factors. For example, weather predictions use models based on variables such as precipitation levels, humidity, air pressure, temperatures, wind speeds, and movement of transition fronts. While it is easy to know if a prediction was accurate (e.g., it either rained when predicted, or it didn't), it can be difficult to know how much influence was exerted by any one variable (e.g., did it rain because the temperature went down, or vice versa?). Similarly, in advertising, it's difficult to know how much an advertising spend drove sales, and with more particularity, how much an advertising spend in one format (e.g., broadcast media) drove sales as compared to an advertising spend in another format (e.g., online advertising). The advertising industry uses models (e.g., media mix models, "MMM") to evaluate the efficacy (e.g., key performance indicators, "KPI," such as return on investment, "ROI") of advertising strategies. Media mix models may also sometimes be referred to as mixed media models or marketing mix models. Like weather or traffic prediction, the models used are generally retrospective, analyzing aggregate historical data to estimate how much an advertising strategy contributed to achieving a particular objective, e.g., conversions. Advertisers may use the models to make predications for future advertising expenses. Online advertising networks are often part of many of these strategies, and the network's advertising customers are grading the network's advertising products using the industry models. However, the models come from outside vendors and function in various different ways, usually "black box," some of which bias towards vender-preferred philosophies or methodologies. These biases may reflect well or poorly on the online advertising network, and this creates confusion in the market as to the actual value.

Described herein are systems for, and methods of, validating third-party models. This may be analogized to verifying the accuracy of a particular ruler or thermometer, rather than directly measuring a distance or temperature. In brief, according to some embodiments, a simulator starts with an initial population data set (which may be based on an actual population state or generated at random) segmented according to one or more classifications (e.g., market interest, satiation, interest activity, brand favorability/loyalty, and access). The simulator iteratively applies transition functions to the data, each transition function simulating an incremental change in population distribution across segments based on a corresponding event or expectation. For example, the simulator may include a transition function corresponding to a week of television advertising at a particular budget. This simulation establishes a "ground truth." The simulation can be re-run on the same initial population data set with variations in the functions or parameters for the functions, and comparisons between the different simulation runs illuminate the cumulative impact of the variations. For example, a simulation run with the television advertising budget set to zero, compared to a simulation run with the television advertising budget set to a value greater than zero, can demonstrate the ROI for the television advertising budget. If the parameters and functions are sufficiently accurate, a retrospective model looking at the end data should assign the same (or similar) values to a given KPI. Accordingly, by applying a model to a test history generated by the simulation, the simulation may be used to validate the model.

One example simulation described herein is referred to as the Aggregate Marketing System Simulator ("AMSS"). The AMSS is a simulation tool capable of generating aggregate-level time series data related to marketing measurement (e.g., channel-level marketing spend, website visits, competitor spend, pricing, sales volume, etc.). It simulates the movement of consumers between discrete latent states following a Markov model. The simulation is capable of generating marketing data across a wide range of marketing/modeling situations and establishes a "ground truth" for marketing impact. (E.g., return on ad spend, marginal return on ad spend, optimized allocations of marketing budget, etc.) It is an evaluation tool that simulates marketing systems at the aggregate level. The model evaluation framework comes in three parts: (1) a data simulation model, (2) a methodology for reporting ground truth for key marketing metrics under any setting of the data simulation, and (3) a system for evaluating marketing methodologies against the simulated data. Models are evaluated based on their ability to accurately estimate key marketing metrics such as return on advertising spend ("ROAS"). Estimates from models (applied to data from the AMSS simulation) are compared to the "ground truth" established by the simulations.

These simulations, including the AMSS, and use of these simulations to evaluate models, is described in reference to an illustrative example computing environment. However, application of these simulations is not limited to this example. The simulations and evaluations described have application beyond marketing and advertising.

Figure 1B:
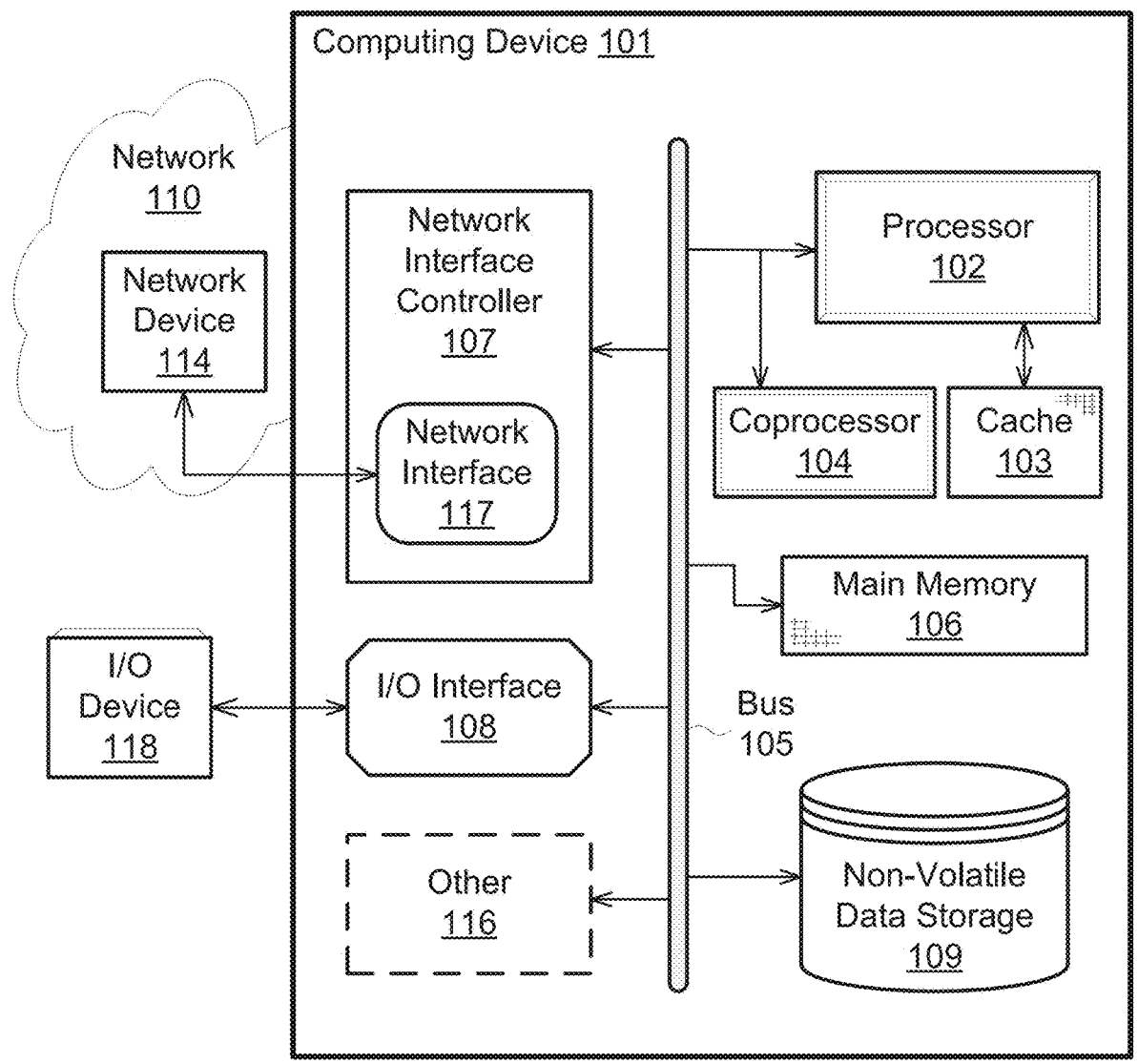
FIG. 1B is a block diagram illustrating an example computing device suitable for use in the various implementations described herein.

FIG. 1A is a block diagram illustrating an example computing environment 100. The computing environment 100 includes a communication network 110 through which media devices 120 receive media content. Media devices 120 may include, passive media receiver devices and/or interactive media presentation devices. The communication network 110 may include, for example, television and/or radio broadcast infrastructure, satellite communication infrastructure, cable media infrastructure, telephony networks, and/or data networks such as the Internet. The computing environment 100 includes data processing systems ("servers") such as a distributor server 130, a model analysis server 140, and a simulation server 150. These servers may use data storage systems such as the distributor data storage 136 and the simulation data storage 156. FIG. 1B, described in more detail below, is a block diagram illustrating an example computing device 101 suitable for use as some types of media device 120 or for configuration as any of the servers 130, 140, and 150 illustrated in FIG. 1A. FIG. 1B also illustrates an example network 110, which enables communication between various nodes, e.g., communication in between the servers 130, 140, and 150, and/or communication between the servers 130, 140, and 150, and the media devices 120.

Still referring to FIG. 1A, and in more detail, the network 110 enables communication between various nodes such as between the distributor server 130 and a media device 120. The network 110 may include, for example, broadcast networks, telephony networks, cable networks, and data networks such as the Internet. In general, a data network enables communication between various nodes ("network devices") such as between computing devices 101 (shown in FIG. 1B). In some implementations, data flows through the network 110 from a source node to a destination node as a flow of data packets, e.g., in the form of data packets in accordance with the Open Systems Interconnection ("OSI") layers. A flow of packets may use, for example, an OSI layer-4 transport protocol such as the User Datagram Protocol ("UDP"), the Transmission Control Protocol ("TCP"), or the Stream Control Transmission Protocol ("SCTP"), transmitted via the network 110 layered over an OSI layer-3 network protocol such as Internet Protocol ("IP"), e.g., IPv4 or IPv6. A network 110 is composed of various network devices ("nodes") linked together to form one or more data communication paths between participating devices. Each networked device includes at least one network interface for receiving and/or transmitting data. For example, in some data networks, data is transmitted as one or more data packets. An illustrative data network is the Internet; however, other networks may be used. The network 110 may include an autonomous system ("AS"), i.e., a network that is operated under a consistent unified routing policy (or at least appears to from outside the AS network) and is generally managed by a single administrative entity (e.g., a system operator, administrator, or administrative group). The network 110 may be composed of multiple connected sub-networks or AS networks, which may meet at one or more of: an intervening network (a "transit network"), a dual-homed gateway node, a point of presence ("POP"), an Internet eXchange Point ("IXP"), and/or additional other network boundaries. The network 110 can be a local-area network ("LAN") such as a company intranet, a metropolitan area network ("MAN"), a wide area network ("WAN"), an inter network such as the Internet, or a peer-to-peer network, e.g., an ad hoc Wi-Fi peer-to-peer network. The data links between nodes in the network 110 may be any combination of physical links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol including, but not limited to, so-called generation "3G," "4G," and "5G" protocols. The network 110 may include radio, television, cable, and/or satellite broadcast networks. The network 110 may include short-range wireless links, e.g., via Wi-Fi, BLUETOOTH, BLE, or ZIGBEE, sometimes referred to as a personal area network ("PAN") or mesh network. The network may be public, private, or a combination of public and private networks. The network 110 may be any type and/or form of data network and/or communication network.

Suitable example media devices 120 include, for example, televisions, television auxiliary boxes (e.g., cable converters and tuners, also known as a "set-top box"), media streaming devices, video game devices (including multi-purpose gaming and media streaming devices), tablets, data phones ("smart" phones), radio receivers, speech-recognition "assistant" devices, wearables such as "smart" watches, public media displays such as digital banners and billboards, and so forth. In some instances, the media device 120 is a client computing system, or processor-based device, that executes applications, presents output to a user, and receives input from the user. The client computing system may be any kind of computing device, including, for example, a desktop computer, a laptop or notepad computer, a mobile device such as a tablet or electronic pad, a personal digital assistant, a smart phone, a video gaming device, a television or television auxiliary box, a kiosk, or any other such device capable of presenting media received via the network 110. In some implementations, the media device 120 includes one or more hardware elements for facilitating data input and/or data presentation, e.g., function keys, a keyboard, programmable "soft" keys, a remote, an indicator light, a display, a touch screen, a microphone, a speaker, and/or a haptic feedback device. In some implementations, the media device 120 is implemented using special purpose logic circuitry, e.g., an application specific integrated circuit ("ASIC"). In some implementations, the media device 120 is implemented using a system on a chip ("SoC") semiconductor device that includes at least one processor (or microprocessor) core. In some implementations, the media device 120 is implemented using a general purpose computing processor. FIG. 1B, described in more detail below, illustrates a computing device 101 that, in some configurations, is suitable for use as a media device 120.

In some implementations, the media device 120 runs an operating system managing execution of software applications on the media device 120. The operating system, in some instances, is provided with the media device 120. In some implementations, the media device 120 executes an application such as a browser application (e.g., a web browser) capable of receiving data formatted according to the suite of hypertext application protocols such as the Hypertext Transfer Protocol ("HTTP") and/or HTTP encrypted by Transport Layer Security ("HTTPS"). In some such implementations, the browser facilitates interaction with one or more servers via interfaces presented at the media device 120 in the form of one or more web pages. In some instances, the browser application is provided with the media device 120. In some implementations, the media device 120 executes a custom application, e.g., a media streaming application, a game, or any other application that interacts with servers, e.g., a distributor server 130. Interactions between the custom application and the distributor server 130 via the network 110 may use standard protocols such as HTTP and HTTPS, or may use application-specific protocols, e.g., a custom application-layer protocol implemented over a transport-layer protocol such as UDP, TCP, or SCTP. In some implementations, one or more of the servers with which the media devices 120 communicate supports a custom instruction set, e.g., an application programming interface ("API"), and the custom application executed on the media device 120 implements the API. An application can implement an API using, for example, a library or software development kit ("SDK") provided to the application's developer.

In some implementations, some media devices 120 may act as a client device in an interaction with the model analysis server 140, e.g., to request or obtain analytic data. In some implementations, some media devices 120 may act as a client device in an interaction with the simulation server 150, e.g., to request or obtain simulation data. In some implementations, some media devices 120 may be media receivers that might not be suitable for such interactions.

The media devices 120 may receive data from, or exchange data with, various servers such as the distributor server 130. In some implementations, one or more of the servers 130, 140, and 150 are implemented using special purpose logic circuitry, e.g., an application specific integrated circuit ("ASIC"). In some implementations, one or more of the servers 130, 140, and 150 are implemented using a system on a chip ("SoC") semiconductor device that includes at least one processor (or microprocessor) core. In some implementations, one or more of the servers 130, 140, and 150 are implemented using a general purpose computing processor. FIG. 1B, described in more detail below, illustrates a computing device 101 that, in some configurations, is suitable for use as the distributor server 130, the model analysis server 140, and/or the simulation server 150.

In FIG. 1A, the distributor server 130 provides for media distribution and/or statistics collection regarding media distribution. For example, the distributor server 130 may be a media streaming server (e.g., as part of a content delivery network, "CDN"), may be a media access server, may be a content selection server, and/or may be a statistics gathering server (e.g., collecting statistics for media requests, audience scope, coupon utilization, redirects, page views, impressions, clicks, conversions, etc.). The distributor server 130 uses distributor data storage 136, e.g., to retrieve media for distribution, select content for distribution, and/or to store statistics regarding media distribution.

The model analysis server 140 is a computing system that provides analysis of historical data, e.g., using one or more analytic models. For example, in some implementations, the model analysis server 140 accesses "real-world" data from a distributor data storage 136 to provide one or more values for performance metrics using models such as a media mix model ("MMM"). Performance metrics may include, for example, return on investment ("ROI"), return on advertising spend ("ROAS"), marginal return on advertising spend ("mROAS"), and so forth. In some implementations, the model analysis server 140 may be configured to access simulated data from a simulation data storage 156 to run similar analytics over artificial data. In some implementations, the model analysis server 140 is agnostic to whether the data in the simulation data storage 156 is artificial. In some implementations, the model analysis server 140 is configured to perform additional analysis, e.g., comparing the analytic results of a model to an expected result, e.g., from a simulation, and to identify a margin error.

The simulation server 150 is a computing system that runs simulations and manages data for the simulations. The simulation server 150 is configured to access the simulation data storage 156 for storing simulation data and retrieving simulation configurations. In some implementations, the simulation server 150 provides an interface (e.g., a web page, a custom application, an API, etc.) for a modeler to use in configuring and executing simulations. The simulations are explained in more detail below.

The data storage 136 and 156 may each be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks ("SAN"), network attached storage ("NAS"), and redundant storage arrays (e.g., "RAID" arrays). In some implementations, the data storage 190 hosts a relational database, e.g., using a Relational Database Management System ("RDBMS"). In some implementations, the data storage 190 manages data stored as files, e.g., XML files.

FIG. 1B is a block diagram of an example computing device 101. The example computing device 101 is suitable for use in implementing the computerized components described herein, in accordance with an illustrative implementation. The computing device 101 can be used, for example, to implement an illustrative media device 120, distributor server 130, model analysis server 140, simulation server 150, and/or various other illustrative systems described in the present disclosure. In broad overview, the computing device 101 includes a processor 102 for performing actions in accordance with instructions, e.g., instructions held in cache memory 103. The illustrated example computing device 101 includes one or more processors 102 and coprocessors 104 in communication, via a bus 105, with main memory 106, a network interface controller 107, an input/output ("I/O") interface 108, and a non-volatile data storage 109. In some implementations, the computing device 101 may include additional interfaces or other components 116. Generally, a processor 102 will load instructions from main memory 106 (or from non-volatile data storage 109) into cache memory 103, load instructions from cache memory 103 into onboard registers, and execute instructions from the onboard registers. In some implementations, instructions are encoded in and read from a read-only memory ("ROM") or from a firmware memory chip (e.g., storing instructions for a Basic Input/Output System ("BIOS")), not shown. As shown, the processor 102 is directly connected to the cache memory 103; however, in some implementations, the cache memory 103 is integrated into the processor 102 or implemented on the same circuit or chip as the processor 102. Some implementations include multiple layers or levels of cache memory 103, each further removed from the processor 102. Some implementations include multiple processors 102 and/or coprocessors 104 that augment the processor 102 with support for additional specialized instructions (e.g., a math coprocessor, a floating point coprocessor, and/or a graphics coprocessor). As shown, the coprocessor 104 is closely connected to the processor 102; however, in some implementations, the coprocessor 104 is integrated into the processor 102 or implemented on the same circuit or chip as the processor 102. In some implementations, the coprocessor 104 is further removed from the processor 102, e.g., connected to the bus 105. The network interface controller 107 controls one or more network interfaces 117 for connection to network devices 114 (e.g., for access to a network 110). The I/O interface 108 facilitates sending and receiving data to various I/O devices 118 such as, but not limited to, keyboards, pointing devices (mice, trackballs, etc.), touch screens, microphones, motion sensors, video displays, speakers, haptic feedback devices, printers, and so forth. In some implementations, one or more of the I/O devices 118 are integrated into the computing device 101. In some implementations, one or more of the I/O devices 118 are external to, and separable from, the computing device 101. In some implementations, the computing device 101 is implemented using special purpose logic circuitry, e.g., an application-specific integrated circuit ("ASIC") or a system on a chip ("SoC") semiconductor device that includes the processor 102 and one or more additional components, e.g., the cache memory 103, network interface controller 107 and network interface 117, and one or more I/O interfaces 108.

In more detail, the processors 102 may be any logic circuitry that processes instructions, e.g., instructions fetched from the cache memory 103, main memory 106, non-volatile data storage 109, or other memory not shown. The processor 102 includes a number of data and instruction registers. In some implementations, on start-up ("boot"), the processor 102 loads initial instructions from a BIOS into the registers, including instructions for loading more instructions, and executes instructions from the registers. In some implementations, the BIOS instructions cause the processor 102 to load an operating system ("OS"), which in turn causes the processor 102 to load and execute one or more programs. The processors 102 may be augmented by one or more ancillary coprocessors 104, which are auxiliary processing units with specialized instruction sets for specific purposes. In some implementations, a processor 102 faced with an unrecognized instruction will pass the instruction to a coprocessor 104, e.g., via a special bus, and only generate an un-recognized instruction fault if the coprocessor 104 also does not recognize the instruction. The processors 102 and coprocessors 104 may each be single core or multi-core processor(s). The computing device 101 may include multiple distinct processors 102 and/or multiple distinct coprocessors 104. For example, in some implementations, a general purpose processor 102 such as a multi-core central processing unit ("CPU") may be augmented with one or more special purpose coprocessors 104, such as a math coprocessor, floating point coprocessor, or a graphics processing unit ("GPU"). For example, a math coprocessor 104 can assist the processor 102 with high precision or complex calculations. In some implementations, the processor(s) 102 and coprocessors 104 are implemented as circuitry on one or more "chips." The computing device 101 may be based on any processor 102, or set of processors 102 and/or coprocessors 104, capable of operating as described herein.

The cache memory 103 is generally a form of computer memory placed in close proximity to a processor 102 for fast access times. In some implementations, the cache memory 103 is memory circuitry that is part of, or on the same chip as, a processor 102. In some implementations, there are multiple levels of cache memory 103, e.g., L2 and L3 cache layers. In some implementations, multiple processors 102, and/or multiple cores of a processor 102, share access to the same cache memory 103.

The main memory 106 may be any device suitable for storing computer readable data. The main memory 106 is a device that supports direct access to specified addresses; i.e., the main memory 106 is random access memory ("RAM"). In some implementations, the main memory 106 is a volatile semiconductor memory device such as dynamic random-access memory ("DRAM"), synchronous dynamic random-access memory ("SDRAM"), double data rate SDRAM ("DDR SDRAM"), static random-access memory ("SRAM"), T-RAM, Z-RAM, and so forth. A computing device 101 may have any number of devices serving as main memory 106.

The non-volatile data storage 109 may be any device suitable for storing computer readable data between power cycles. In some implementations, the non-volatile data storage 109 is a device with fixed storage media, such as magnetic disks, e.g., a hard disk drive ("HDD"). In some implementations, the non-volatile data storage 109 is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the non-volatile data storage 109 is a non-volatile semiconductor memory device such as an erasable programmable read-only memory ("EPROM"), electrically erasable programmable read-only memory ("EPROM"), or Flash memory. In some implementations, the main memory 106 is a solid-state drive ("SSD"), e.g., using multi-level cell ("MLC") NAND-based Flash memory. A computing device 101 may have any number of devices serving as non-volatile data storage 109.

Still referring to FIG. 1B, the bus 105 is an interface that provides for data exchange between the various internal components of the computing device 101, e.g., connecting the processor 102 to the main memory 106, the network interface controller 107, the I/O interface 108, and non-volatile data storage 109. In some implementations, the bus 105 further provides for data exchange with one or more components external to the computing device 101, e.g., other components 116. In some implementations, the bus 105 includes serial and/or parallel communication links. In some implementations, the bus 105 implements a data bus standard such as integrated drive electronics ("IDE"), peripheral component interconnect express ("PCI"), small computer system interface ("SCSI"), or universal serial bus ("USB"). In some implementations, the computing device 101 has multiple busses 105.

The computing device 101 may include, or provide interfaces 108 for, one or more input or output ("I/O") devices 118. Input devices include, without limitation, keyboards, pointing devices (a mouse, a trackball, etc.), touch screens, touchpads (e.g., electromagnetic induction pads, electro-static pads, capacitive pads, etc.), styluses, microphones, joysticks, foot pedals, Inertial Measurement Units ("IMU"s), accelerometers, gyroscopes, tilt-sensors, motion sensors, environmental sensors, and Musical Instrument Digital Interface ("MIDI") input devices such as MIDI instruments (e.g., MIDI keyboards). Output devices include, without limitation, video displays, speakers, haptic feedback devices, refreshable Braille terminals, lights, servos, MIDI output devices such as MIDI synthesizers, and two dimensional or three dimensional printers (including, but not limited to, inkjet printers, laser printers, thermographic printers, stereolithographic printers, extrusion deposition printers, and metal sintering printers).

The network 110 enables communication between various nodes such as the computing device 101 and a network device 114. In some implementations, data flows through the network 110 from a source node to a destination node as a flow of data packets, e.g., in the form of data packets in accordance with the Open Systems Interconnection ("OSI") layers. A flow of packets may use, for example, an OSI layer-4 transport protocol such as the User Datagram Protocol ("UDP"), the Transmission Control Protocol ("TCP"), or the Stream Control Transmission Protocol ("SCTP"), transmitted via the network 110 layered over an OSI layer-3 network protocol such as Internet Protocol ("IP"), e.g., IPv4 or IPv6. The network 110 is composed of various network devices ("nodes") linked together to form one or more data communication paths between participating devices. Each networked device includes at least one network interface for receiving and/or transmitting data, typically as one or more data packets. An illustrative network 110 is the Internet; however, other networks may be used. The network 110 may be an autonomous system ("AS"), i.e., a network that is operated under a consistent unified routing policy (or at least appears to from outside the AS network) and is generally managed by a single administrative entity (e.g., a system operator, administrator, or administrative group). The network 110 may be composed of multiple connected sub-networks or AS networks, which may meet at one or more of: an intervening network (a "transit network"), a dual-homed gateway node, a point of presence ("POP"), an Internet eXchange Point ("IXP"), and/or additional other network boundaries. The network 110 can be a local-area network ("LAN") such as a company intranet, a metropolitan area network ("MAN"), a wide area network ("WAN"), an inter network such as the Internet, or a peer-to-peer network, e.g., an ad hoc Wi-Fi peer-to-peer network. The data links between nodes in the network 110 may be any combination of physical links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol including, but not limited to, so-called generation "3G," "4G," and "5G"

protocols. The network 110 may include short-range wireless links, e.g., via Wi-Fi, BLUETOOTH, BLE, or ZIGBEE, sometimes referred to as a personal area network ("PAN") or mesh network. The network may be public, private, or a combination of public and private networks. The network 110 may be any type and/or form of data network and/or communication network.

The network interface controller 107 manages data exchanges with devices in the network 110 (e.g., the network device 114) via the network interface 117 (sometimes referred to as a network interface "port"). The network interface controller 107 handles the physical and data link layers of the Open Systems Interconnection ("OSI") model for network communication. In some implementations, some of the network interface controller's tasks are handled by the processors 102 and/or coprocessors 104. In some implementations, the network interface controller 107 is incorporated into the processor 102, e.g., as circuitry on the same chip. In some implementations, a computing device 101 has multiple network interfaces 117 controlled by a single controller 107. In some implementations, a computing device 101 has multiple network interface controllers 107. In some implementations, each network interface 117 is a connection point for a physical network link (e.g., a Cat-5 Ethernet link). In some implementations, the network interface controller 107 supports wireless network connections and an interface 117 is a wireless (e.g., radio) receiver/transmitter (e.g., for any of the IEEE 802.11 Wi-Fi protocols, near field communication ("NFC"), BLUETOOTH, BLUETOOTH LOW ENERGY ("BLE"), ZIGBEE, ANT, or any other wireless protocol). In some implementations, the network interface controller 107 implements one or more network protocols such as Ethernet. Generally, a computing device 101 exchanges data with other computing devices via physical or wireless links through a network interface 117. The network interface 117 may link directly to another device or to another device via an intermediary device, e.g., a network device 114 such as a hub, a bridge, a switch, or a router, connecting the computing device 101 to the network 110.

The network device 114 may be a hub, switch, router, modem, network bridge, another computing device 101, or any other network node. In some implementations, the network device 114 is a network gateway. In some implementations, the network device 114 is a routing device implemented using customized hardware such as a special purpose processor and/or a ternary content-addressable memory ("TCAM").

The other components 116 may include an alternative I/O interface, external serial device ports, and any additional coprocessors 104 that are connected via the bus 105. For example, a computing device 101 may include an interface (e.g., a universal serial bus ("USB") interface) for connecting external input devices, output devices, or additional memory devices (e.g., portable flash drive or external media drive).

The illustrated computing device 101 is suitable for implementing systems that manage or organize data. For example, in some implementations, the computing device 101 hosts a database. A database, or more specifically a database management system ("DBMS"), organizes data in accordance with a database definition, e.g., a database schema. For example, in a relational database, the DBMS maintains data in a table-like data structure. In a relational database, data is entered into a "column" within a "row," where the column represents a particular data type, category, or grouping, and the row represents an association between data in various columns; the columns and rows form a table. In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language ("XML") databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

A client or user of a database can add data to, modify data in, or retrieve data from the database using database instructions, e.g., queries in a database query language such as the Structured Query Language ("SQL"). One or more database instructions may be grouped together into a database transaction. Traditionally, a database provides transaction atomicity, consistency, isolation, and durability. These properties are known by the acronym "ACID." In some implementations, a DBMS provides all of the ACID properties. However, in some implementations, the DBMS does not provide all of the ACID properties.

One example simulation described herein is referred to as the Aggregate Marketing System Simulator ("AMSS"). AMSS is designed to generate an aggregate time-series data resulting from natural consumer behavior and changes in this behavior due to marketing interventions. It does this by segmenting an example consumer population into distinct groups based on features that characterize the consumers' relationships with the categories and the brand. In the simulation, each segment is represented as a count of consumers fitting the respective segment; the AMSS simulation does not track individuals. Consumers in different segments have different media consumption patterns, responses to advertising, purchase behavior, etc. Over the course of time, a given consumer's relationship with a category and/or the brand may change in response to uncontrolled forces (e.g., seasonality and competitive activity) as well as advertiser-controlled marketing interventions. These changes are reflected in the AMSS simulation by adjusting the population counts fitting the various segments to represent the migration of consumers to segments that reflect their new mindsets. The changes in population segmentation then lead to changes in the aggregate behavior of the population. For example, marketing interventions increase advertiser sales by moving consumers to segments corresponding to higher probabilities of making purchases in the category and/or purchasing the advertised brand.

Figure 2A:
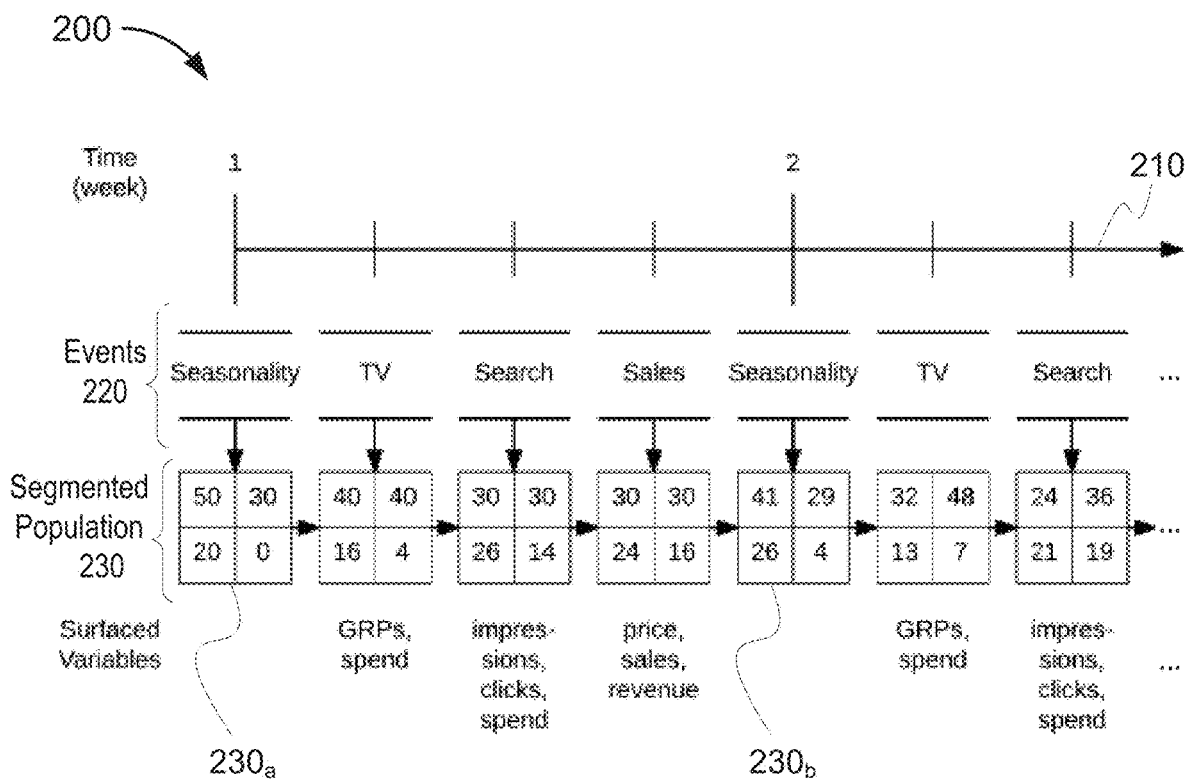
FIG. 2A is an illustration of a timeline over which a simulator iteratively migrates a population between segments.

FIG. 2A is an illustration 200 of a timeline 210 over which a simulator iteratively migrates a population between segments. The illustration 200 reflects a simplified scenario in which the simulator tracks a population of one hundred individuals divided into four segments. The illustration 200 includes a timeline 210 over which various events 220 are iteratively applied. A segmented population 230 is shown based on each iterative event, e.g., in a first segmentation state $230_a$ and a later segmentation state $230_b$. The various market forces driving consumer behavior are conceptualized as an ordered sequence of events 220 that repeat across time intervals. Each event 220 corresponds to a specific non-actionable or actionable force with its own impact on consumer disposition and behavior. Changes in consumer disposition are reflected by the migration of consumers from pre-event to post-event population segmentations 230. Also, each event generates observable data. In particular, FIG. 2A depicts a scenario with four repeating events: seasonality, television, paid search, and sales. The "seasonality" event reflects non-actionable forces that change the size of the market over time, and drives consumer migrations in and out of the market for the category. Television and paid search are marketing interventions controlled by the advertiser. They drive migrations that are generally favorable to the advertiser, and they also generate related data such as the media volume and spend. The last event 220 shown in FIG. 2A is the "sales" event, which generates advertiser and competitor sales. It may also drive migrations; for example, a consumer's loyalty to, or opinion of, the advertiser brand may change as part of a post-purchase evaluation process.

Each event 220 impacts all subsequent events through changes to the population segmentation 230. This ripple effect supports modeling interactions between different influential forces (e.g., television advertisements can encourage brand queries, thereby increasing the volume of search inventory) and helps to accurately represent the complex relationships within a marketing system. AMSS provides flexibility in the set of events, their design, and their sequencing. Event specifications are described in more detail below. Modelers have the freedom to add or remove specific market forces from the simulation and to change event specifications and sequencing to reflect different models of consumer behavior. Examining the performance of analytical methods over a wide range of scenarios allows modelers to find and design methodologies that are robust to a wide range of statistical issues.

The population segmentation 230 represents variations in consumer mindsets. AMSS conceptualizes the consumer mindset, with regard to both the category and the advertiser brand, as a discrete hidden variable; it then uses consumer mindset to segment the population. Between segments, differences in mindset may lead to differences in behavior, from media consumption and response to purchase behavior. The aggregate behavior of the population is determined by the size of each segment. For example, if a high proportion of consumers belong to segments corresponding to high brand loyalty, the advertiser brand will have high market share. AMSS segments the population along six dimensions, each tracking a particular aspect of the consumer's relationship with the category or the brand. The first three dimensions track the consumer's relationship with the category and are referred to as "category states." The second three track the consumer's relationship with the advertiser brand and are referred to as "brand states." A six-element tuple s=(s1, s2, s3, s4, s5, s6) can represent a segment, with each value in the tuple describing the consumer mindset in the corresponding dimension. The six category and brand states and the corresponding states are listed in the following table (Table 1). More details on the meaning and usage of each category and brand state follow below.

TABLE 1

| State Type | Examples of Potential Values |
|---|---|
| Category: | |
| ① Market | in-market; out-of-market |
| ② Satiation | satiated; unsatiated |
| ③ Activity | inactive; exploratory; purchase |

TABLE 1-continued

| State Type | Examples of Potential Values |
|---|---|
| Brand: | |
| ④ Favorability | unaware; unfavorable; neutral; somewhat-favorable; favorable |
| ⑤ Loyalty | switcher; loyal; competitor-loyal |
| ⑥ Availability | low; average; high |

Market State.

The market state specifies whether members of the population should be considered part of the pool of potential customers for the category. This allows us to label part of the population as being entirely uninterested in the category, even under the most purchase-friendly conditions (e.g., high marketing pressure, low pricing). As an example, the market for a medication treating hypertension consists of only those individuals who have been diagnosed with the condition. Those not suffering from hypertension would never consider purchasing, regardless of any marketing interventions.

AMSS splits the population into "in-market" and "out-of-market" individuals. The number of individuals in the market for a certain category of goods can change over time. Some changes are seasonal, i.e., they repeat in a regular pattern, say once a year. For example, the travel category has an annual seasonality that responds to the school year, national holidays, weather patterns, etc. There can also be more general trends that affect "in-market" population. Examples include the rising adoption of smartphones leads to a growing market for apps, the effect of economic factors on luxury goods, and the effect of gasoline prices on SUV sales. AMSS allows the modeler to specify both seasonal patterns and more general trends in the rate of market participation.

Satiation State.

The satiation state specifies whether a person's demand for the category has been satisfied by a past purchase. In AMSS, consumers are either "satiated" or "un-satiated." Unsatiated individuals may become satiated after a purchase in the category; satiated individuals will eventually become unsatiated over time. Tracking satiation allows AMSS to model effects such as dips in sales following price-promotions. Both the advertiser's own promotions and competitor promotions can create depressed demand in succeeding weeks, since this is a category-wide effect. In the real world, the time it takes satiation effects to wear off depends on the category. In categories where demand cycles quickly, such as perishable foods, satiation fades quickly. It fades more slowly in categories with longer intervals between purchases, such as travel or durable goods categories. In the simulation, the rate of decay is part of the model specification.

Activity State.

The activity state tracks the consumer's location along the path to purchase. AMSS segments the population into three activity states: "inactive," "exploratory," and "purchase." Consumers in different activity states have different media consumption behaviors, different responses to marketing, and different purchase behavior.

Figure 2B:
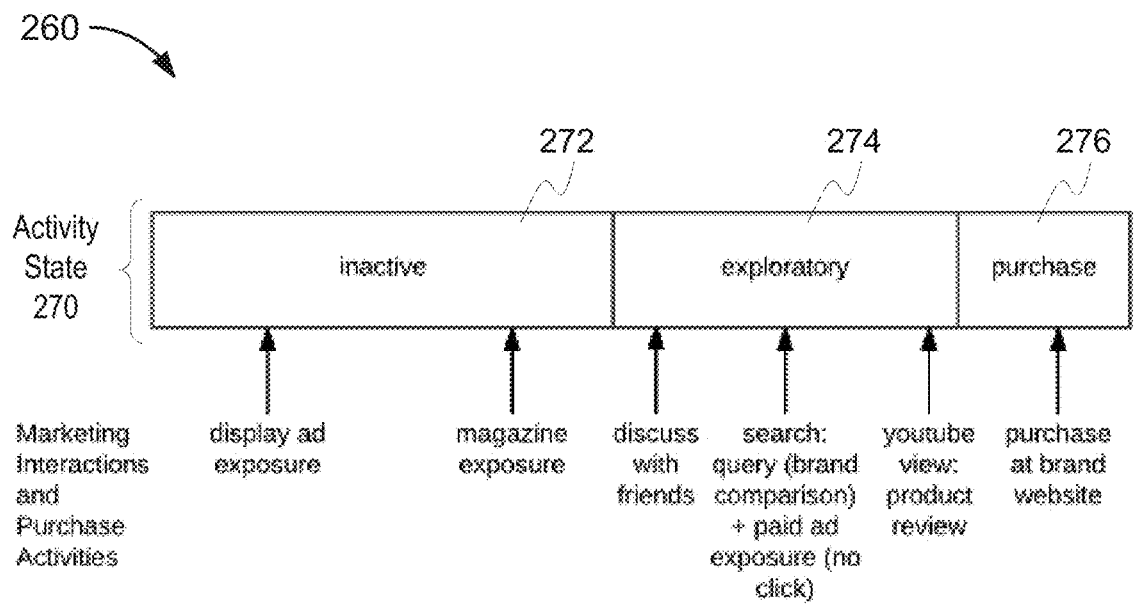
FIG. 2B shows an example of the actions that may be performed, and the activity that might occur, in each of a set of activity states.

FIG. 2B shows an example of the actions 260 a consumer might perform, and the marketing activity that might occur, in each activity state 270. Marketing interactions and purchase activities may move a consumer from an inactive state 272 to an exploratory state 274, or from an exploratory stage 274 to a conversion event, e.g., a purchase 276.

"Inactive" individuals are not currently engaged in any activities related to the category. Certainly, they do not make purchases in the category. They also do not show any observable interest in the category, say by making category-related search queries or online site visits. "Exploratory" individuals are considering making a purchase, and conducting related activities to help them make their decision. For example, the "exploratory" population may make generic and branded search queries as part of the decision-making process. They still have not decided to make a purchase in the category. Individuals who reach the "purchase" state are in the process of making a purchase. This may be at a brand-specific location such as the brand website, or a non-specific location such as a department store, grocery store, fare aggregator. The brand chosen by individuals who are in the process of making a purchase depends on factors such as brand favorability, brand loyalty, brand availability, and price at the point of purchase.

Tracking the consumer's activity state allows the simulator to differentiate marketing tools that target different audiences, both in terms of reach and precision. Mass marketing media formats such as television and radio will reach consumers in a wide range of activity states, while other media like paid search will tend to target a smaller number of consumers further along the path to purchase. Tracking activity state also allows the simulator to follow natural and marketing-influenced progress along the path to purchase. It is necessary for the consumer to reach the "purchase" state in order for the advertiser to make a sale.

Brand Favorability State.

Brand favorability measures a consumer's opinion of the brand. Generally, high levels of brand favorability correspond to higher probabilities of purchase of the advertiser's brand. In AMSS, consumers are segmented into five groups based on brand favorability: "unaware," "unfavorable," "neutral," "somewhat favorable," and "favorable" consumers. Marketing tools may increase brand sales by increasing brand favorability. Note that brand favorability can be high for multiple brands simultaneously, so high brand favorability does not automatically imply brand purchase or brand loyalty.

Brand Loyalty State.

Consumers can be loyal to the advertiser" brand, loyal to a competitor, or have divided loyalties. AMSS tracks brand loyalty through the brand loyalty state; consumers have state "loyal," "competitor-loyal," or "switcher." It is important to differentiate between brand favorability and brand loyalty. Brand loyalty is exclusive, as opposed to brand favorability; consumers can have highly favorable opinions of multiple brands. Consumers loyal to a particular brand have low probability of buying from a competitor. Consumers that are loyal neither to the advertiser nor to its competitors are labeled as 'switchers'; at time of purchase, these consumers choose from multiple brands based on price, convenience, and other factors.

Brand Availability State.

Brand availability refers to the physical and mental availability of the advertiser brand to the consumer, that is, how physically or mentally easy the brand is to buy. Brand availability is physically affected by brand distribution, i.e., the presence of the brand at retail locations. Certain marketing interventions grab consumer attention for the brand or increase its convenience; these increase the mental availability of the brand. For example, point-of-purchase displays bring the advertised brand to the attention of the consumer through prominent placement at the point of sale. In the online space, search ads bring brands greater prominence on the search results page, increasing the brand's mental availability. This can be helpful in drawing sales from "switchers" with no strong brand preference.

In AMSS, brand availability can be "low," "average," or "high" for each consumer. Consider, for example, modeling the impact of physical distribution on sales of breakfast cereal. If a brand of cereal is available at only 70% of grocery and convenience stores, brand availability should be "average" for the 70% of consumers purchasing breakfast cereal from stores carrying the brand, and "low" for the other 30% of the population. Efforts to increase distribution increase brand availability for some consumers from "low" to "average." In-store displays increase brand availability for some consumers from "average" to "high."

In some instances, only certain subsets of the possible segmentation tuples are used. In AMSS, only consumers that are both "in-market" and "un-satiated" may move out of the "inactive" activity state. This enforces the concept that "out-of-market" or "satiated" individuals have no interest in making a purchase in the category and will not engage in purchase-related activities. As a result, as shown below in Table 2, there are only six valid category segments (s1, s2, s3). Second, only consumers with "favorable" brand favorability can be loyal. This is reflected below in Table 3. The following tables illustrate the resulting 198 possible segmentation tuples (s1, s2, s3, s4, s5, s6):

TABLE 2

| Market | Satiation | Activity |
| --- | --- | --- |
| "out-of-market" | "satiated" | "inactive" |
| "out-of-market" | "unsatiated" | "inactive" |
| "in-market" | "satiated" | "inactive" |
| "in-market" | "unsatiated" | "inactive" |
| "in-market" | "unsatiated" | "exploratory" |
| "in-market" | "unsatiated" | "purchase" |

TABLE 3

| Favorability | Loyalty |
| --- | --- |
| "unaware" | "switcher" |
| "unfavorable" | "switcher" |
| "neutral" | "switcher" |
| "somewhat favorable" | "switcher" |
| "favorable" | "switcher" |
| "favorable" | "loyal" |
| "unaware" | "competitor-loyal" |
| "unfavorable" | "competitor-loyal" |
| "neutral" | "competitor-loyal" |
| "somewhat favorable" | "competitor-loyal" |
| "favorable" | "competitor-loyal" |

There are six rows of possible category tuples in Table 2, and eleven rows of possible brand pairs in Table 3, representing sixty-six total possible combinations. Each of the sixty-six possible combinations may be paired with an availability of "low," "average," or "high." This represents one hundred ninety eight possible segmentation tuples tuples (s1, s2, s3, s4, s5, s6). In some implementations, fewer combinations may be used. For example, some implementations may determine that a consumer is unlikely to have both a "favorable" view of a brand and also be "competitor-loyal". In some implementations, additional combinations or segment classes may be used. For example, some implementations may allow for a consumer to have a "somewhat favorable" view of a brand and also be "loyal".

As will be described in more detail below, a population may be placed into segments based on segmentation tuples. In some implementations, a simulation population is placed into initial segment states at random. In some implementations, a simulation population is placed into initial segment states in an equal distribution. In some implementations, a simulation population is placed into initial segment states in an a distribution representative of a known "real world" state. In some implementations, a simulation population is placed into initial segment states suggestive of a new product or new market entry, e.g., with no brand awareness or loyalty.

The simulations move populations from one segment to another based on transition functions representative of events (e.g., the example events 220 shown in FIG. 2A). The transition functions migrate populations through state transitions, e.g., as shown in FIG. 2B. In some implementations, the simulation generates a time series of the various population states as the simulation progresses through iterative application of the transition functions. The time series may represent, for example, the influence of a marketing campaign or strategy over time. These time series may then be used to establish a ground truth for model validation.

Figure 3A:
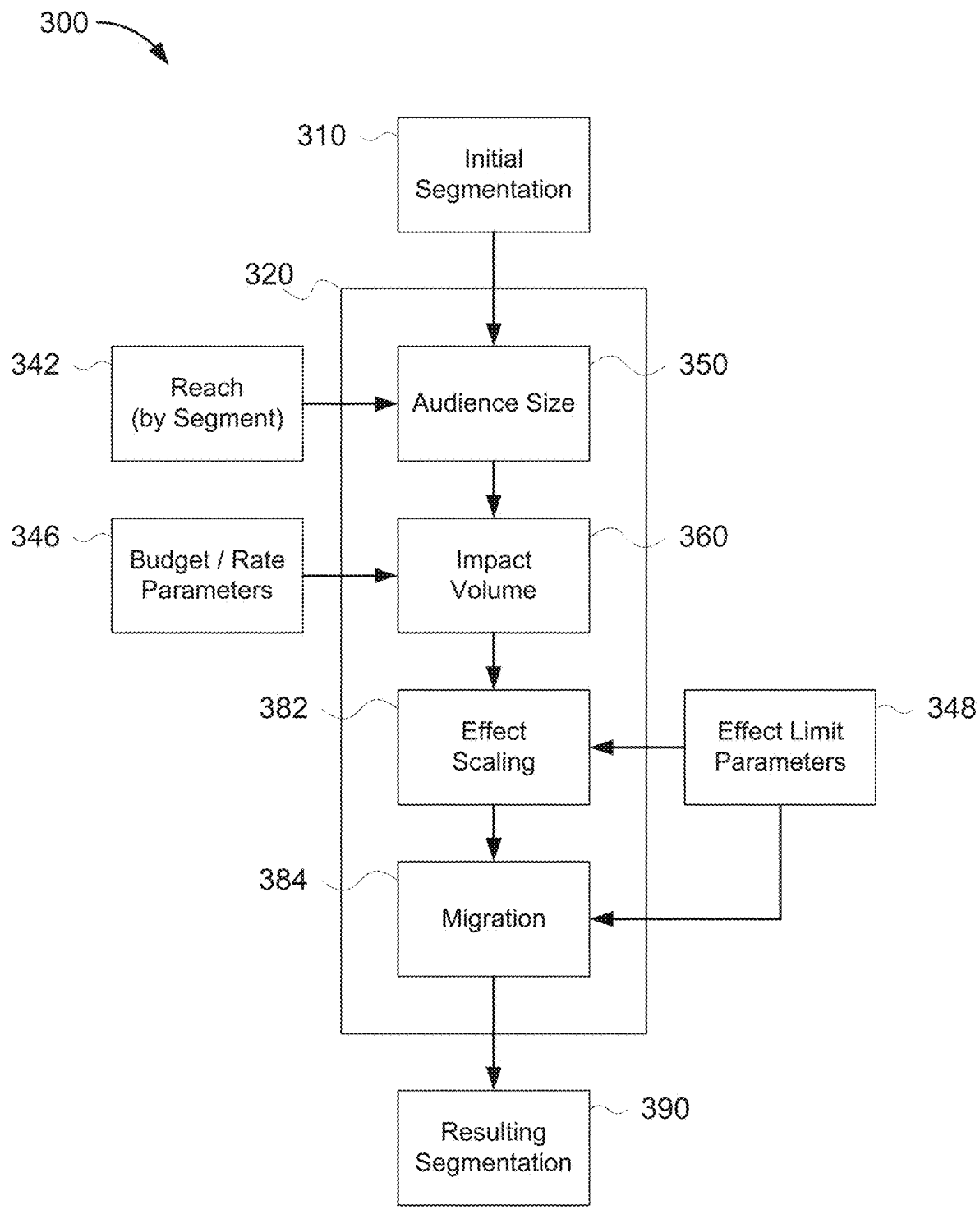
FIG. 3A is a diagram of an example transition function.
Figure 3B:
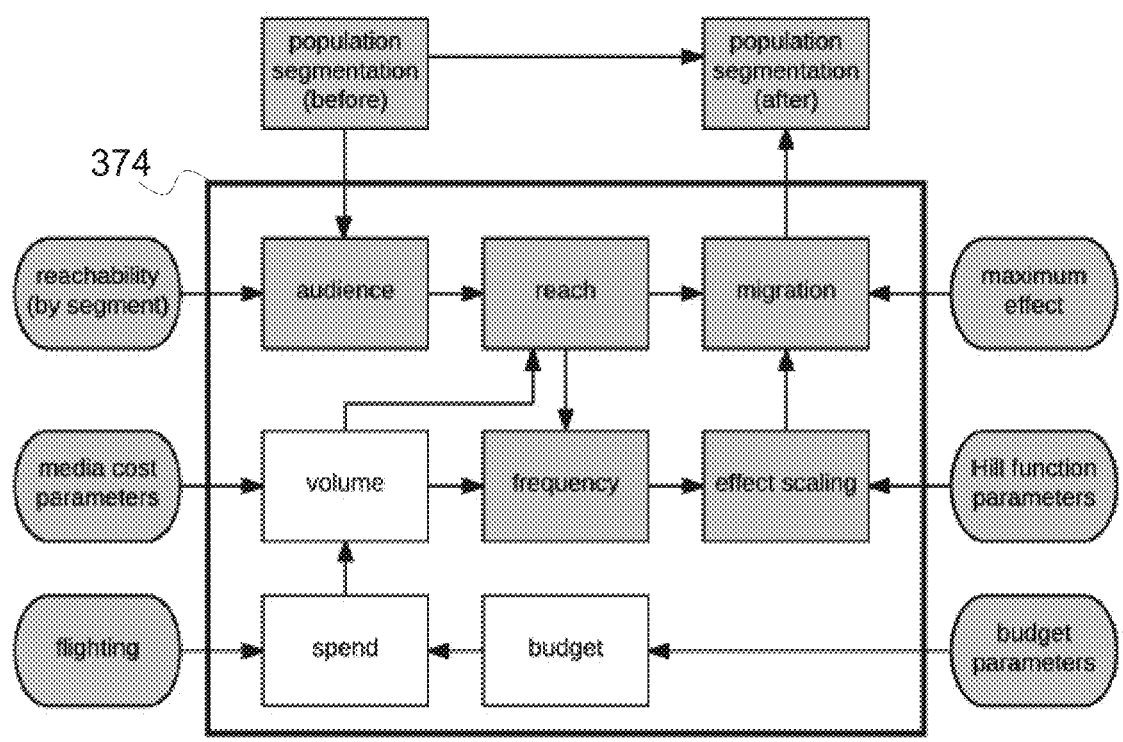
FIG. 3B is a diagram of an example transition function for modeling impact of a media channel.
Figure 3C:
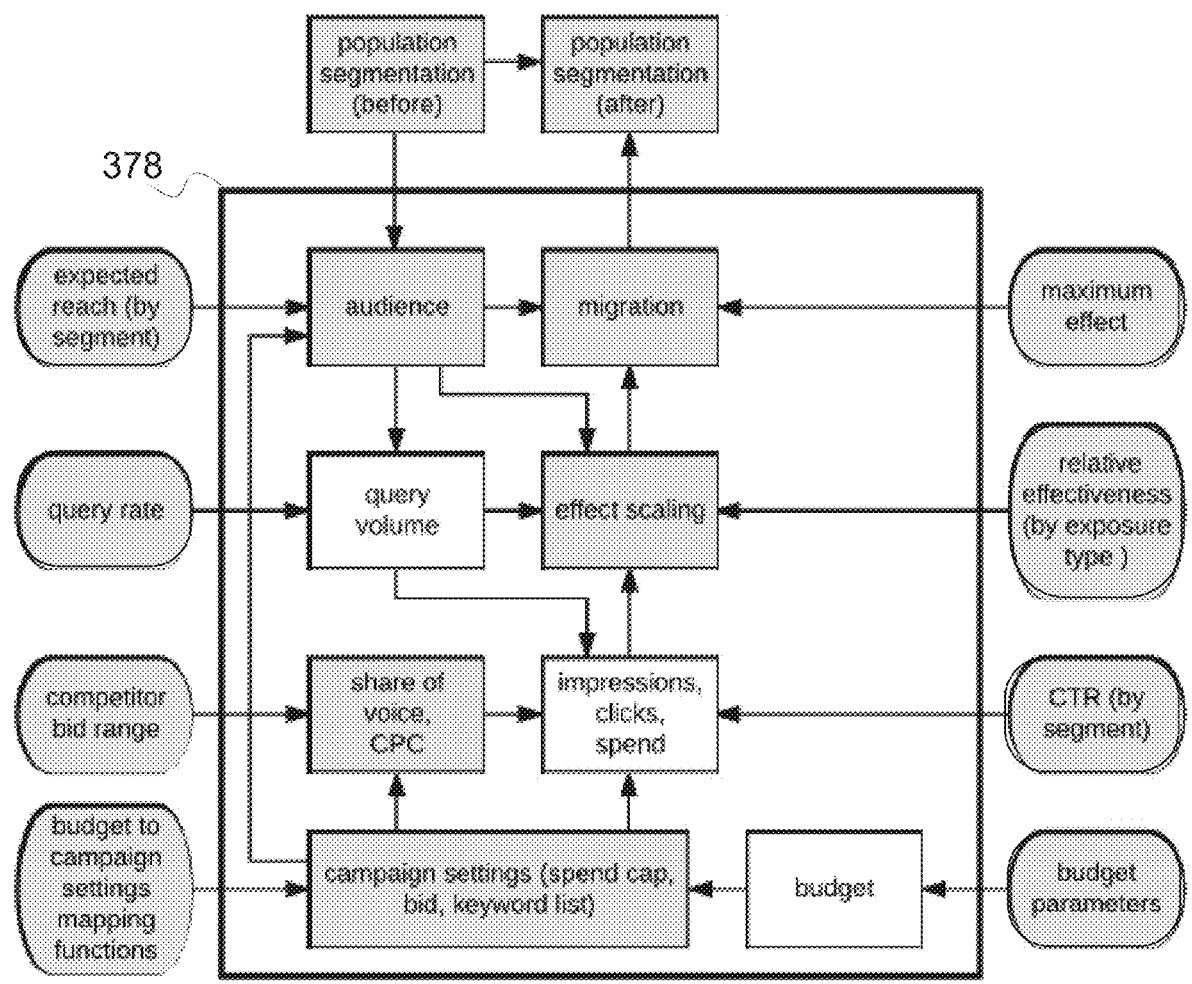
FIG. 3C is a diagram of an example transition function for modeling impact of online marketing.

FIG. 3A is a diagram 300 of an example transition function 320. The transition function 320 accepts an initial segmentation state 310 and generates a resulting segmentation state 390. Each transition function 320 is configured by parameters. For example, the illustrated transition function 320 accepts a reach parameter 342 and budget/rate parameters 346. The illustrated transition function 320 is also restricted by an effect limit parameter 348. These parameters control how the transition function 320 migrates populations between segments. For example, the audience size 350 is determined by the reach 342, and the impact volume 360 is determined by the budget/rate parameters 346. Likewise, the effect limit parameters 348 limit the effect scaling 382 and resulting migration 384. The transition function 320 applies the parameters to generate the resulting segmentation 390. FIG. 3B and FIG. 3C each illustrate particular implementations of the transition function 320, and are described in more detail below.

Some implementations use distinct transition functions 320 to simulate the behavior (e.g., the channel's audience targeting and ad effectiveness) of each ad channel. The simulation server 150 then sequences these events into a custom simulation scenario. Each transition function 320 takes the current population segmentation as input and returns an updated population segmentation. Some implementations also have the transition functions 320 return additional related output variables such as media spend and/or media volume. The transition functions 320 are parameterized to provide a flexible framework for specifying interrelated media variables such as spend and volume, and their effect on the population segmentation (e.g., budget/rate parameters 346). A particular media channel's behavior is specified by the parameterization of an appropriate transition function 320. For example, a transition function modeling impact of online placement associated with search terms specifies the manner in which query volume, impressions, clicks, and search spend are generated. Different parameterizations specifying the query rates and click-through rates for each population segment can be used to create separate branded and generic search events from the same module.

The simulation server 150 applies an ordered sequence of transition functions 320, each modeling a corresponding event or type of event, to drive migration between segments. There are many different kinds of events, each driving consumer migration in its own particular way. For example, even in the absence of marketing intervention, the disposition of consumers toward a category and brand will vary and evolve over time. Some events reflect these natural forces that drive changes in the consumer mindset. Other events reflect the effects of marketing interventions, such as media advertising. The action of making a purchase in the category can also change the consumer mindset. For example, the consumer can become satiated and/or loyal. The transition functions 320 model these various events and event types. In one example, FIG. 3B illustrates a transition function 320 simulating impact of media marketing (e.g., television marketing). In another example, FIG. 3C illustrates a transition function 320 simulating impact of online marketing. In FIG. 3B and FIG. 3C, modeler-specified input parameters are indicated using ovals, whereas internal generated values are indicated using rectangles; the shaded rectangles indicate "hidden" values and the unshaded rectangles indicate "observed" variables.

The size of the market for a particular category of goods or services changes naturally over time. For example, the market size for a travel category such as vacation cruises is impacted by consumers' leisure time and discretionary income. Variation in the market due to annual holiday and vacation schedules is seasonal. The travel market also responds to changes in the economy, which impact consumers' discretionary income. The natural migration of population between "in-market" and "out-of-market" segments accounts for both seasonal changes and more general trends in the population's interest in the category. In AMSS, natural migration is the first event within each time interval. That is, for each time interval (e.g., each simulated week) the natural forces determine a starting point, with marketing interventions building on the resulting baseline. When natural migration brings a large number of people into "in-market" segments, marketing forces have more opportunities to encourage brand purchases; periods with low market participation correspondingly limit the opportunities for marketing.

FIG. 3B is a diagram 372 of a media impact function 374, which is a transition function 320 for modeling impact of a media channel. The media impact function 374 simulates impact of media marketing (e.g., television marketing or radio marketing). Modelers using the media impact function 374 can specify the values of parameters controlling the media channel's audience size and composition, the media volume and spend, and the media effectiveness, according to various simulation needs. FIG. 3B depicts the structure of the media impact function 374 as used in AMSS. The media impact function 374 accepts parameterization of audience, spend, volume, and effect. Some of the variables generated by the media impact function 374, such as the weekly spend, are observed, while others are hidden. In particular, the population migration caused by the media is calculated as the "effect" of the media impact function 374, which is not typically available in a real-world analysis, such as an MMM study.

In some implementations, the media impact function 374 calculates the media audience as follows. Each media channel has its own audience, i.e., the population that interacts with the media. This audience is the maximum population reachable through advertising in the particular media channel. For example, the audience may be the number of viewers of a television program or the number of households reading a particular newspaper. A population segment's reachability can be described as the probability a consumer from the segment is part of the media channel's audience during a given time interval. Heterogeneity in reachability across population segments reflects the media channel's ability to target consumers with different levels of interest in the category and/or the brand. Mass marketing tools such as television will reach broad segments of the population, with very coarse targeting. More targeted media reach individuals with a prior interest in the category and/or the brand at higher rates. In AMSS, the modeler specifies the reachability of each population segment. The audience size is calculated based on the current size of the segment and the reachability.

In some implementations, the media impact function 374 calculates the weekly spend as follows. The weekly spend is calculated from the media channel's budget and fighting pattern. In the simulation settings, the time intervals are divided into groups called budget periods, and each budget period is given a target spend called the budget. The fighting pattern specifies the proportion of the budget to assign to each week in a budget period. The budget assigned to a budget period, e.g., a year, is one of the mechanisms an advertiser can use to control a media plan. The budget is split into a weekly spend based on the fighting pattern. For example, suppose the modeler specifies a budget of $100 to be spent over a 4-week budget period, with a fighting pattern of (0.20, 0.00, 0.65, 0.15); the advertiser would spend $20 the first week, $0 the second week, $65 the third week, and $15 the fourth week. In some implementations, the media impact function 374 uses the budget assigned to the media channel to determine the values of dependent variables, such as the weekly spend and media volume. This budget is an observed, advertiser-controlled variable. It is defined as the target spend of the media channel over a specific range of time intervals known as the budget period. For example, an advertiser could assign one million dollars to the newspaper channel in the fourth quarter of 2016.

In some implementations, the media impact function 374 calculates the media volume as follows. The volume is the total number of exposures to a particular media content for consumers in a given segment during a specific time interval. The volume is calculated from the weekly spend based on a cost function. For example, a simple cost function is a unit cost per exposure. Some implementations allow for variability in the weekly unit cost through mean and variance parameters.

In some implementations, the media impact function 374 calculates the reach and frequency as follows. The reach over a population segment refers to the number of consumers in the segment who are exposed to the advertiser's ads in the media channel at least once during the time interval. In some implementations, it is calculated based on the audience size and the total volume of exposures for the segment. For example, the reach may be calculated based on the audience size within a segment and the total volume of advertisement exposure for the segment. Some implementations use a normal approximation based on the assumption that ad exposures for each individual occur as independent Poisson processes. The average frequency is the average number of ad exposures among consumers with at least one ad exposure. It is calculated based on the volume of exposures for a segment divided by the reach within the segment.

In some implementations, the media impact function 374 updates the population segmentation as follows. The amount of migration in population segmentation driven by a given iteration of the media impact function 374 depends on both the reach and frequency. The reach determines the affected population, i.e., those with the potential to migrate. The frequency determines the migration probabilities. Consumers exposed to advertising have the potential to migrate to new population segments; thus the affected population in each segment is the reach. Migration probabilities depend on the frequency of ad exposure and the effectiveness of those ads. At high frequencies, consumers in the media audience will migrate between segments according to a transition matrix $Q^{(k)}$ specifying maximal migration probabilities between segment pairs (for modeling a media channel "k"). In some implementations, the transition matrix $Q^{(k)}$ is defined as the product of successive transitions in each dimension affected by marketing (e.g., segmentation dimensions corresponding to factors for category activity, brand favorability, brand loyalty, and brand availability). That is, for a media channel "k" and dimension "l," the transition for segments "s" may be $Q^{(k,l)} = (Q_{i,j}^{(k,l)})s_l \times s_l$. For example, transitions in activity state driven by television ads are determined by $Q^{(tv, activity)}$. To specify a 20% chance of converting "inactive" consumers to the activity state of "exploratory," and a 10% chance of converting "inactive" consumers to the activity state of "purchase," a modeler would set the first row of $Q^{(tv, activity)}$ to (0.7, 0.2, 0.1).

At lower frequencies, the probability of migrating from one segment to another is less. The maximal probability is therefore scaled against the frequency of exposure according to a Hill equation. Hill equations are sigmoidal, making them convenient for parameterizing the media model for increasing returns (at small frequencies) and diminishing returns (at larger frequencies).

$$H(f; \kappa, \zeta) = \frac{1}{1 + (f/\kappa)^{-\zeta}}$$

The parameter $\kappa$ is the half maximal effective concentration, i.e., the frequency at which $H(f) = \frac{1}{2}$. The zeta parameter $\zeta$ is the maximal slope of the curve $H(f)$.

$$q_{s,s'}^{(t,k)} = H(f_t, k, s; \kappa, \zeta) Q_{s,s'}^{(k)} |_{s \neq s'}$$

The Hill transformation has several desirable properties; at the right limit, $H(\infty) = 1$, enforcing the definition of $Q^{(k)}$ as defining the maximal migration probabilities, and the Hill transformation also creates diminishing returns as average frequency increases.

The media impact function 374 described here is capable of modeling the behavior of many traditional media channels, such as television, radio, and print. Using different parameterizations of the media impact function 374, a modeler can include various media channels, each with its own reach, targeting, frequency of exposure, spend, and effectiveness in driving sales or other conversion events (e.g., driving traffic to a website, encouraging attendance at a live event, or other advertising objectives).

FIG. 3C is a diagram 376 of an online marketing impact function 378, which is a transition function 320 for modeling impact of online marketing. Some marketing efforts have a different structure than the media channel model described above. For example, online marketing has inventory restrictions (e.g., limits on impressions) and may use an auction-based pricing system (e.g., an automated auction for placements based on contextual factors such as search keywords or page content).

The online marketing impact function 378 depicted in FIG. 3C is, in some ways, analogous to the media impact function 374 depicted in FIG. 3B. The added complexities allow for interactions with other media channels and seasonal changes in the population in complex ways. For example, previous events in the simulation path that change the state of the population can affect the volume in the online marketing impact function 378 and its effectiveness. Activity state, for example, affects a consumer's probability of conducting a relevant brand-agnostic search, and both activity state and brand state can affect the consumer's probability of conducting a relevant branded search. Brand favorability and brand loyalty also affect a consumer's click-through rate ("CTR"), i.e., their probability of clicking on the brand's online ads. The online marketing impact function 378 also accounts for other features, such as organic search activity in the absence of paid ads, which allows modelers to identify the incremental effect over organic search.

One of the complexities in the online marketing impact function 378 depicted in FIG. 3C differentiating it from the media impact function 374 depicted in FIG. 3B is the campaign budget used to control delivery of impressions. A modeler can specify how the campaign settings for search will change in response to the budget. As in the media impact function 374, the budget represents the target spend in the channel over a fixed budget period, e.g., a year. However, in online marketing, an advertiser may control search spend through adjustments to the weekly spend cap, the bid, or a keyword list. This can be reflected in the online marketing impact function 378.

In some implementations, the modeler specifies (for the online marketing impact function 378) a function that maps the budget to a weekly spend cap. For example, the budget may be divided evenly among the weeks in the budget period. Or, an advertiser may have uncapped spend (cap=∞), and affect the volume of paid search spend through other controls. For example, the modeler may specify a function that maps the budget to a weekly bid (per keyword or simplified to a single value for all keywords). An advertiser may, for example, increase a bid linearly with the yearly budget. Or, an advertiser may set a constant bid and affect the volume of paid search spend through other controls. As another example, the modeler may specify a function that maps the budget to the length of the keyword list. As the keyword list grows, so too does the simulated volume of matching queries made by the population.

In some implementations of the online marketing impact function 378, the query volume is calculated as follows. Members of each population segment may have different levels of interest in an offering category and/or brand, and thus different probabilities of making relevant online queries. This consideration impacts media with different levels of targeting. The query volume is based, in part, on the scope of the audience. The audience is the number of people making queries that match a keyword list associated with (or targeted by) the online marketing campaign. The audience may be calculated based on the population of each segment, the probability members of each segment have of making a relevant query, and the proportion of those queries covered by the keyword list. Consumers in different segments have different probabilities of making brand-agnostic and branded queries, depending on their level of interest in the category and/or the brand. Paid search is generally targeted to higher levels of category and/or brand interest. Generic search ads, for example, target individuals in the "exploratory" or "purchase" activity states. Branded search ads targets segments with higher levels of brand favorability and brand loyalty. Targeting gives advertisers confidence that the population exposed to search ads has a higher and more immediate level of interest in the category and/or the brand. Modeling multiple channels with different levels of targeting allows modelers to explore challenges related to selection bias. In some instances, each member of the audience makes queries matching the keyword list according to a Poisson process with rate $\lambda^{(k)}$, as may be specified by the modeler.

In some implementations of the online marketing impact function 378, an effect is calculated analogous to that of the media impact function 374. However, one difference is in the formulation, of the effect size. The effect size may vary by query volume, impressions, and interactions ("clicks"). Given the audience and the volume of search, the following may be calculated: the number of people who made a query on the keyword list, but not served the advertiser's ad; the number of people who were served an ad but did not interact with it (e.g., they may have engaged with a competitor ad or an organic search result); and the number of people who engaged with (e.g., clicked on) the advertiser's paid advertising.

In some implementations, a conversion transition function is used to model whether consumers will perform a conversion event, e.g., making a purchase or accepting an offer. In AMSS, this conversion transition function is used as the last transition function in each iterative time period. During this event, AMSS calculates the advertiser sales per segment, $y_t$, and the competitor sales per segment, $z_t$, for time interval t. In addition, post-purchase changes in consumer mindset may cause changes in the population segmentation, which can be addressed by the conversion transition function.

Figure 4A:
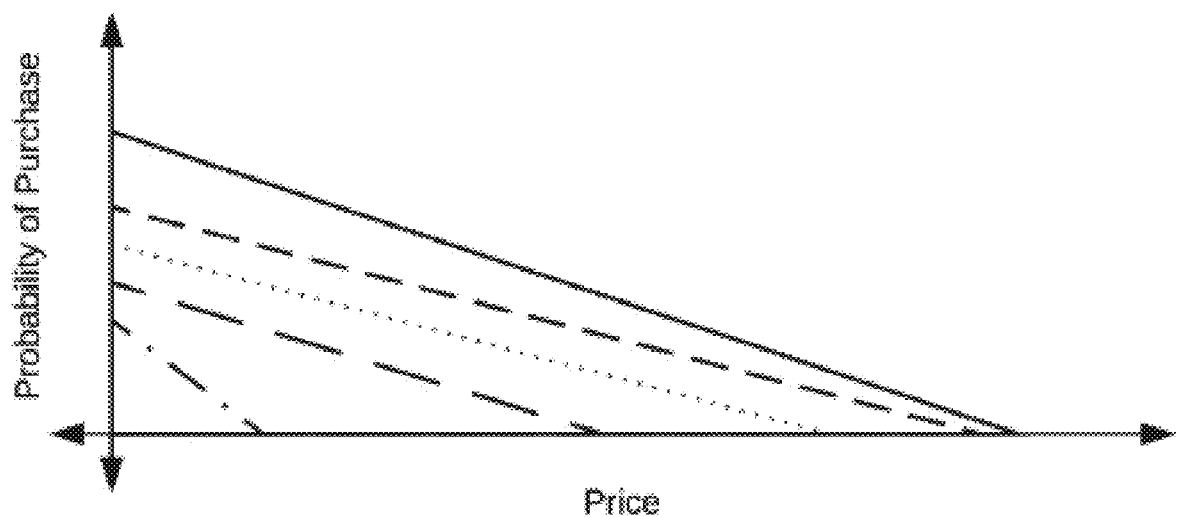
FIG. 4A is a graph of demand curves for multiple segments in a competition-free environment.

FIG. 4A is a graph of demand curves for multiple segments in a competition-free environment. The plotted population segments have activity state "purchase," brand loyalty "switcher," and brand availability "average." The brand favorability is favorable (solid), somewhat favorable (dash), neutral (dot), unaware (long dash), or negative (dot-dash).

Figure 4B:
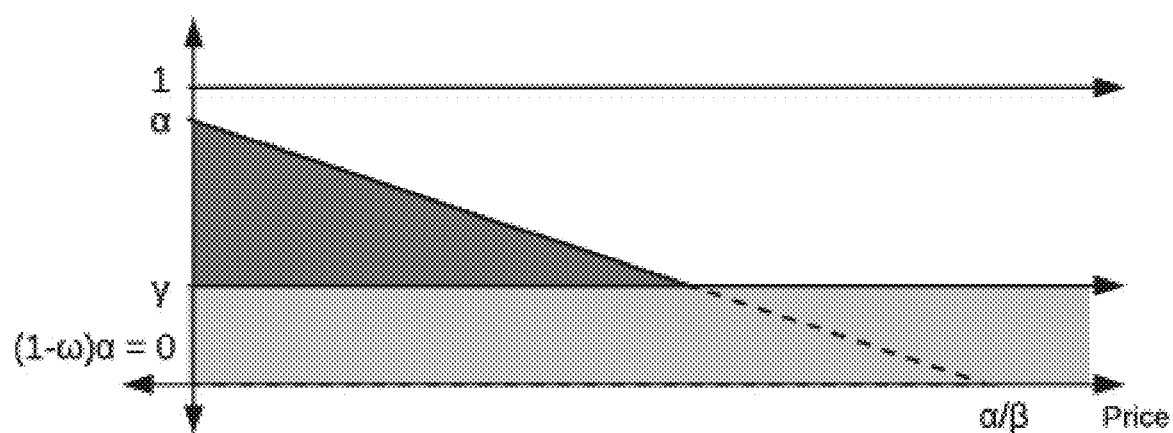
FIG. 4B, FIG. 4C, and FIG. 4D are graphs of purchase probabilities plotted against price changes in a competitive environment.
Figure 4C:
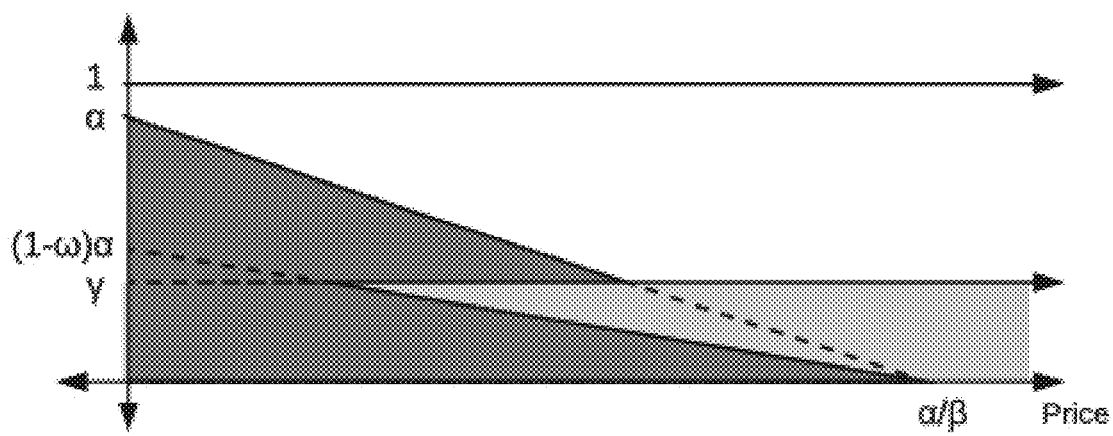
Figure 4D:
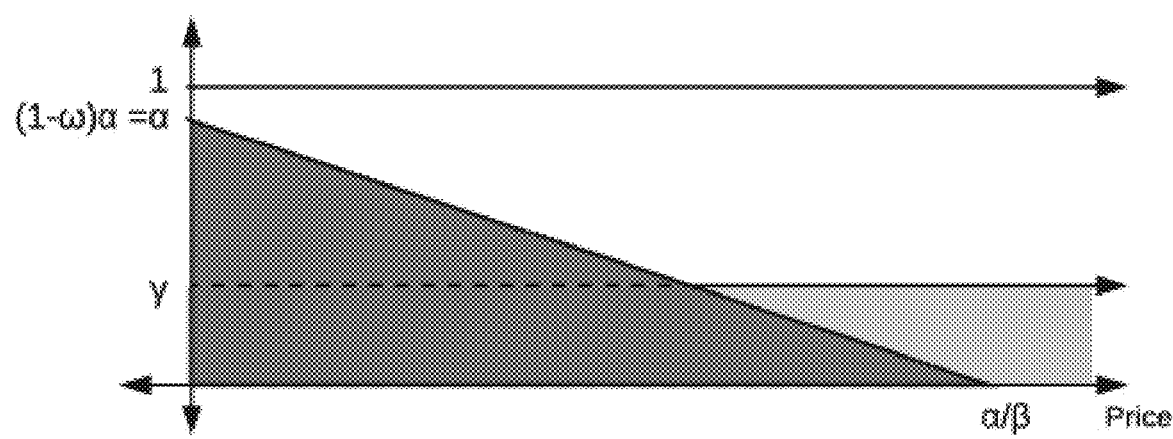

FIG. 4B, FIG. 4C, and FIG. 4D are graphs of purchase probabilities plotted against price changes in a competitive environment. At any price p, the height of the lightly shaded region corresponds to the probability of purchase for the competitor's brand, $r^{(z)}$. The combined height of the darker shaded region corresponds to the probability of purchase for the advertiser's brand, $r^{(y)}$. As explained in more detail below, ω specifies the degree to which brand and competitor sales are replacements for each other. The plots show changes in competitor vs advertiser sales at varying levels of ω: ω=1 (top); ω=½ (middle); ω=0 (bottom).

The simulation in AMSS takes into account the effects of pricing and competition on advertiser and competitor sales. It also takes into account differences in purchase behavior between consumers belonging to different population segments. In the absence of competition, in each segment s whose consumers have purchase intent, i.e., the population with segment dimension "purchase," the relationship between the advertiser's product's price and the probability of purchase by any consumer in the segment is specified by a linear demand curve. The demand curves in each segment are parameterized by their y-intercept and negative slope:

$\alpha=(\alpha_s)_{s \in S}$ Each $\alpha_s \in [0,1]$ specifies the probability a consumer in segment s will purchase the advertiser's brand at unit price 0, in the absence of competition.

$\beta=(\beta_s)_{s \in S}$ Each $\beta_s \in (-\infty, \infty)$ specifies the decrease in purchase probability per unit increase in price, in the absence of competition. It controls the sensitivity of consumers in the segment to price. Generally $\beta_s > 0$ so that sales decrease as price increases.

Thus, in a competition free environment, and given product unit price $p_t > 0$ during time interval t, each consumer in segment s will purchase the advertiser's brand with probability:

$$r_{t,s}^{(y^*)} = (\alpha_s - \beta_s p_t) \vee 0 \wedge 1$$

The demand curves reflect differences in purchase behavior between segments. Generally, consumers in segments with high brand favorability, brand loyalty, and/or brand availability are more likely to purchase the advertiser's brand over its competitors' brands; thus these segments should have higher values of $\alpha_s$ and smaller values of $\beta_s > 0$. An example set of demand curves respecting these guidelines is plotted in FIG. 4A. Previously examined marketing interventions such as media advertising encourage sales by changing consumer mindset, causing migration to population segments with more favorable demand curves. Alternatively, pricing strategies, such as promotional discounts, encourage sales by moving consumers along the demand curve to lower price points with higher purchase probabilities.

In AMSS, to avoid the complexity of simulating competitor activity at the same level of detail as advertiser activity, competitor strength is summarized with two time-varying parameters in the sales module. They specify the current strength of the advertiser's competitors and the degree to which the competitor and advertiser sales replace each other:

- $\zeta = (\zeta_{t,s})_{(1:T) \times S}$ Each $\zeta_{t,s} \in [0,1]$ specifies the probability consumers in segment s will purchase the competitor's brand at time t when the advertiser's product's unit price is very high, and thus the advertiser is not making any sales.
- $\omega = (\omega_{t,s})_{(1:T) \times S}$ Each $\omega_{t,s} \in [0,1]$ specifies the degree to which brand and competitor sales are replacements for each other. When $\omega_{t,s} = 1$, competitor sales are unaffected by advertiser pricing, and competitor sales replace advertiser sales to the greatest degree possible. This is the default setting for segments where consumers are "competitor-loyal," and is illustrated in FIG. 4B. When $\omega_{t,s} = 0$, advertiser sales are unaffected by the presence of the competitor, and advertiser sales replace competitor sales to the greatest degree possible. This is the default setting for segments where consumers are "loyal." This is illustrated in FIG. 4D. By default, "switchers" balance the tradeoff between the advertiser's and its competitors' brands with $\omega_{t,s} = 0.5$, as illustrated in FIG. 4C.

Given the price $p_t$, consumers purchase a competitor brand with probability:

$$r_{t,s}^{(z)} = \{\gamma_{t,s} - (1-\omega_{t,s}) r_{t,s}^{(y^*)}\} \vee 0$$

They purchase the advertiser's brand with probability:

$$r_{t,s}^{(y)} = \max(r_{t,s}^{(y^*)}, \gamma_{t,s}) - r_{t,s}^{(z)}$$

The population of each segment is divided into those who did not make a purchase in the category, those who purchased the advertiser's brand, and those who purchased a competitor's brand. The size of each of these groups is, respectively, $a_{t,K,s}^{(w)}$, $a_{t,K,s}^{(y)}$, and $a_{t,K,s}^{(z)}$. These quantities are generated following a multinomial distribution:

$$(a_{t,K,s}^{(w)}, a_{t,K,s}^{(y)}, a_{t,K,s}^{(z)}) \sim \text{Multinomial}(n_{t,K,s}, (1 - r_{t,s}^{(y)} - r_{t,s}^{(z)}, r_{t,s}^{(y)}, r_{t,s}^{(z)}))$$

With $\lambda^{(y)}$ representing the average number of units purchased by any purchaser in a category, the total brand sales $y_{t,s}$ from population segment s during time interval t is:

$$y_{t,s} \sim a_{t,K,s}^{(y)} + \text{Poisson}(a_{t,K,s}^{(y)} (\lambda^{(y)} - 1))$$

Revenue is calculated as the product of sales $y_{t,s}$ and price $p_t$.

In the AMSS simulation model, post-purchase changes in consumer mindset are reflected by updating segmentation dimensions. First, all purchasers become "satiated." In addition, the purchase experience may affect brand state; following a successful purchase, consumers may become habituated to, or develop a strong preference for, a particular brand. This migration is analogous to migrations driven by marketing interventions, except that frequency is ignored in sales-driven migrations.

Figure 5:
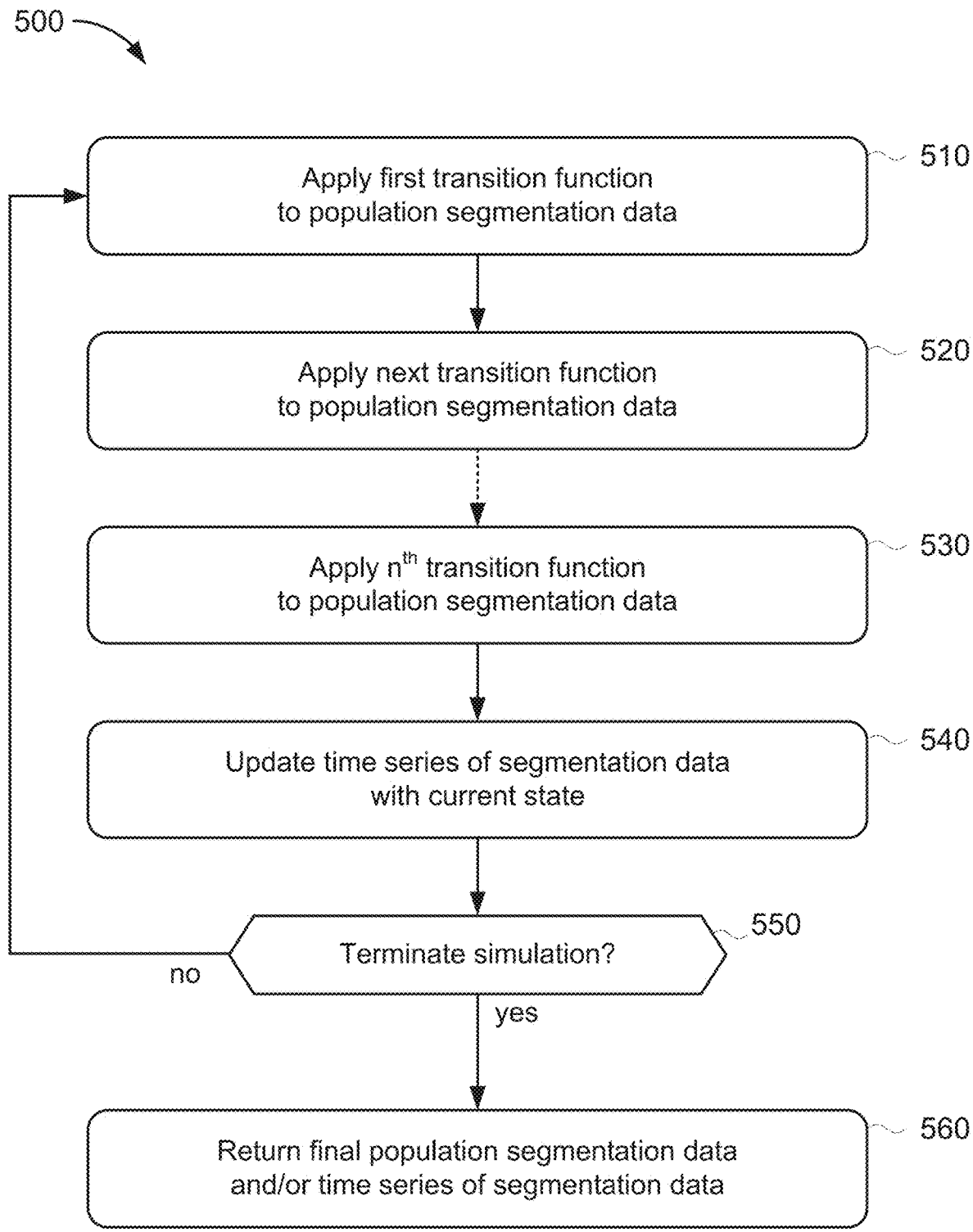
FIG. 5 is a flowchart of a method for iteratively applying transition functions to population segmentation data.

FIG. 5 is a flowchart of a method 500 for iteratively applying transition functions to population segmentation data. In broad overview of the method 500, at stage 510, a simulation server 150 applies a first transition function to population segmentation data. The simulation server 150 iterates through a set of transition functions, by applying, at stage 520, a next transition function to the population segmentation data through stage 530, applying an $n^{th}$ transition function to the population segmentation data. At stage 540, the simulation server 150 updates a time series of segmentation data with a current state of the data. The simulation repeats until a termination event. At stage 550, the simulation server 150 determines whether to terminate the simulation. If not, the simulation server 150 returns to stage 510. Otherwise, at stage 560, the simulation server 150 returns (or provides access to) final population segmentation data and/or the collected time series of segmentation data.

Referring to the method 500 in more detail, at stage 510, a simulation server 150 applies a first transition function (e.g., the transition function 320 described in reference to FIG. 3A) to population segmentation data. In some implementations, the first transition function is a "natural" transition function simulated population migrations that would occur absent external influences such as marketing influences.

At stage 520, the simulation server 150 applies a next transition function to the population segmentation data as modified by the previous application of the first transition function. The simulation server 150 iterates through a set of transition functions, applying each next transition function to the population segmentation data in a deterministic order. In some implementations, the order is specified by a configuration file or other input, e.g., configuration input received from a modeler. The simulation server 150 applies each transition function in sequence through stage 530, wherein the simulation server 150 applies a last ("$n^{th}$") transition function to the population segmentation data.

At stage 530, the simulation server 150 applies the $n^{th}$ transition function to the population segmentation data. In some implementations, the $n^{th}$ transition function is a transition function for simulating conversion (e.g., purchase) events. That is, the last transition function may account for any sales or activities that the preceding events generated within a time frame. In some implementations, the transition function for simulating conversions takes into account both conversions driven by a modeled ad campaign as well as natural conversions and competitor conversions (e.g., sales made by competitors, which may occur either naturally or through competing advertising campaigns). In some implementations, the transition function for simulating conversions updates population segmentation to reflect post-purchase changes in consumer mindsets and categories (e.g., migrating from unsatiated to satiated).

At stage 540, the simulation server 150 updates a time series of segmentation data with a current state of the data. The iterations from stages 510 through 530 simulate a single timeframe, e.g., one day or one week. At the end of the iterations from stages 510 through 530, the simulation server 150 has population segmentation data representative of all the transition functions applied. In some implementations, at stage 540, the simulation server 150 records this state of the population segmentation data in the time series of segmentation data. In some implementations, the simulation server 150 records this state of the population segmentation data by updating a database. In some implementations, the simulation server 150 records this state of the population segmentation data by appending the data to a log file. In some implementations, the simulation server 150 records this state of the population segmentation data by generating an event for processing by a secondary system.

At stage 550, the simulation server 150 determines whether to terminate the simulation. For example, the simulation may be configured to run for a fixed number of iterations, each iteration representing a period of time. The simulation server 150 determines if it has reached the fixed number of iterations. If not, the simulation server 150 returns to stage 510 and continues iteratively applying the transition functions. If, at stage 550, the simulation server 150 determines to terminate the simulation, then the simulation server proceeds to stage 560.

At stage 560, the simulation server 150 returns final population segmentation data and/or the collected time series of segmentation data. In some implementations, the data is returned at stage 560 by writing it to a file or other data storage container in a data storage system, e.g., simulation data storage system 156. In some implementations, the data is returned at stage 560 by returning an identifier or handle to the file or other data storage container. For example, in some implementations, the data is written to a disk, database, or other storage in stage 540; and at stage 560 access is provided to the written data.

For any simulation scenario, the simulator server 150 may be configured to use the method 500 with scenario-specific parameters or configurations to generate a time series of segmentation data for the respective scenario. For example, a scenario with no online advertising may be modeled by eliminating online advertising transition functions or by setting the budget for them to zero. As another example, a scenario with a television advertising spend of one million dollars may be run by configuring a media transition function with a million dollar budget, and another scenario with a television advertising spend of two million dollars may be run by configuring a media transition function with a two million dollar budget; these two scenarios may then be compared. The simulations generate a ground truth that may be used for comparison with other modeling results, as well. Various types of results may be generated. For example, the simulations may be used to estimate a resulting key performance indicator ("KPI") given specified changes in a marketing strategy; the simulations may be used to attribute KPI across a set of media/marketing channels; and/or the simulations may be used to optimize proposed marketing strategies, e.g., to maximize a KPI such as return on investment ("ROI"). The simulations may be run with different variations in strategy and configuration, resulting in different counterfactual scenarios. Results from these different counterfactual scenarios may then be compared to each other, or to results from third party analytic tools and models.

Figure 6:
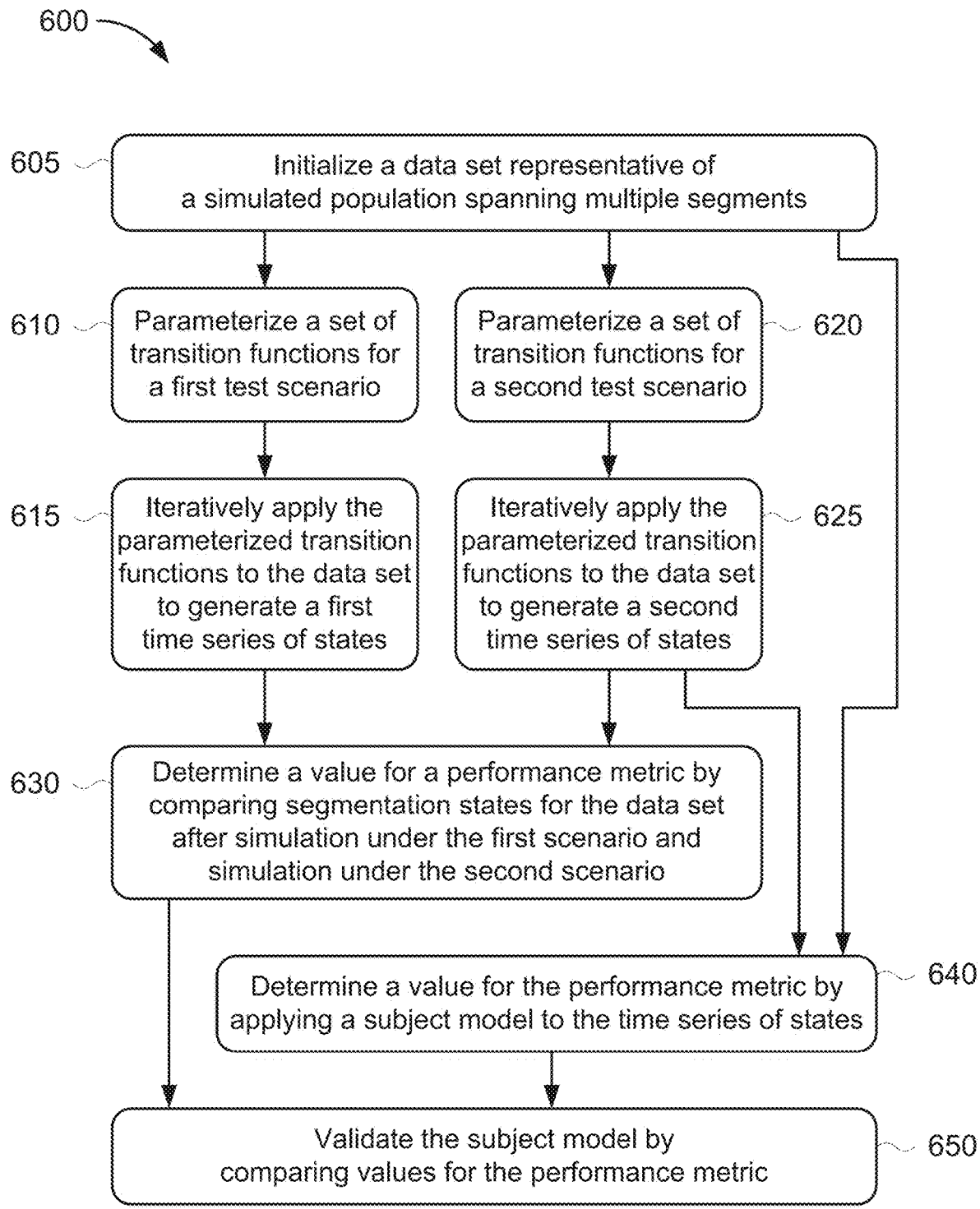
FIG. 6 is a flowchart for an example method of model validation.

FIG. 6 is a flowchart for an example method 600 of model validation. In broad overview of the method 600, at stage 605, the simulation server 150 initializes a data set representative of a simulation population spanning multiple segments. At stage 610, the simulation server 150 parameterizes a set of transition functions for a first test scenario and, at stage 615, iteratively applies the parameterized transition functions to the data set to generate a first time series of states. At stage 620, the simulation server 150 parameterizes a set of transition functions for a second test scenario and, at stage 625, iteratively applies the parameterized transition functions to the data set to generate a second time series of states. As will be explained in more detailed below, the parameterization in stage 610 and the parameterization in stage 620 are different in at least one aspect, which leads to differences between the first time series of states resulting from stage 615 and the second time series of states resulting from stage 625. These differences are analyzed by the simulation server 150. At stage 630, the simulation server 150 determines a first value for a performance metric by comparing segmentation states for the data set after simulation under the first scenario and simulation under the second scenario, e.g., comparing segmentation states for the first time series of states resulting from stage 615 and the second time series of states resulting from stage 625. At stage 640, the simulation server 150 determines a second value for the performance metric by applying a subject model to one of either the first time series of states resulting from stage 615 or the second time series of states resulting from stage 625. For a valid subject model, under the correct parameterization, the second value for the performance metric in stage 640 should be similar to the first value for the performance metric in stage 630. At stage 650, the simulation server 150 validates the subject model by comparing the first value and the second value for the performance metric.

Referring to the method 600 in more detail, at stage 605, the simulation server 150 initializes a data set representative of a simulation population spanning multiple segments. Each segment is a sub-population of the simulation population fitting a segmentation criteria for a segmentation scheme. The simulation population may be segmented in accordance with any of a variety of possible segmentation schemes. For example, in some implementations, the segmentation scheme uses a set of interest descriptors (e.g., in the market for an offer, not in the market for the offer, has an unsatisfied need for the offer, need is satiated, not actively engaged in seeking the offer, exploring the offering, has accepted the offer). In some implementations, the segmentation scheme uses a set of perspective descriptors (e.g., how a segment views a brand associated with an offer (unaware of the brand, unfavorable view, neutral view, somewhat favorable view, or favorable view of the brand), loyalty to the brand (no loyalty/switches easily, loyal to the brand, loyal to an alternative brand/competitor), access to, or availability of, the offer (low, average, high)). In some implementations, the segmentation scheme uses a combination of interest descriptors and perspective descriptors. In some implementations, the segmentation scheme assigns a score or value to each of a set of interest or perspective categories, each score corresponding to a respective descriptor. A vector or tuple of these scores or values then corresponds to a segment. In some implementations, some combinations of scores are excluded (for example, excluding a vector that indicates loyalty to a brand and also an unfavorable view of the brand, which may be considered a contradiction.) Some implementations use the segmenting scheme described above in reference to AMSS.

At stage 610, the simulation server 150 parameterizes a set of transition functions for a first test scenario. In some implementations, the transition functions are the transition functions described above, e.g., in reference to FIG. 3A. Each transition function takes in an initial segmentation state and return a resulting segmentation state. The parameters for each transition function determine how the function will generate the resulting segmentation state for return. In some implementations, the parameters include, for example, a scope or reach for a transition function, a budget or scale for a transition function, and limitations on effects of the transition function. In some implementations, one or more of the transition functions in the set is a natural progression transition. In some implementations, the first transition function in the set represents the natural progression transition. The first test scenario uses the set of transition functions in accordance with the parameterization from stage 610. In some implementations, the same transition functions (or a sub-set of the same transition functions) are used in stage 620 and stage 625, but under different parameterization. In some implementations, a second set of transition functions are used in stage 620 and stage 625.

At stage 615, the simulation server 150 iteratively applies the first set of parameterized transition functions to the data set to generate a first time series of states. In some implementations, the simulation server 150 iteratively applies the parameterized transition functions using the method 500 described above in reference to FIG. 5.

At stage 620, the simulation server 150 parameterizes a set of transition functions for a second test scenario. In some implementations, the set of transition functions is the same set, or a sub-set, of the transition functions used in stage 610 and stage 615. In some implementations, a second set of transition functions are used, different the first set of transition functions used in stage 610 and stage 615; the second set may overlap with the first set. The simulation server 150 configures the second test scenario to differ from the first test scenario in at least one capacity. For example, in some implementations, the second test scenario may include for an advertising channel a larger budget than was allocated in the first scenario. As another example, in some implementations, the second test scenario may include a transition function for an advertising channel not present in the first test scenario. In these examples, the first test scenario results in a first time series of states representing a simulation without the added capacity and the second test scenario results in a second time series of states representing a simulation with the added capacity. Accordingly, differences between the first time series of states and the second time series of states may be attributable to the added capacity. In some implementations, additional test scenarios may be used, e.g., a third time series, a fourth time series, and so on, each scenario representing another variation in the parameterization of the transition functions and/or exclusion or addition of transition functions.

At stage 625, the simulation server 150 iteratively applies the second set of parameterized transition functions to the data set to generate a second time series of states. In some implementations, the simulation server 150 iteratively applies the second set of parameterized transition functions using the method 500 described above in reference to FIG. 5. In some implementations, both stage 615 and stage 625 begin with the same initial data set from stage 605 and result in distinctly different first and second time series of data based on application of either the first or second set of parameterized transition functions.

At stage 630, the simulation server 150 determines a first value for a performance metric by comparing segmentation states for the data set after simulation under the first scenario and simulation under the second scenario, e.g., comparing segmentation states for the first time series of states resulting from stage 615 and the second time series of states resulting from stage 625. As previously indicated, the parameterization in stage 610 and the parameterization in stage 620 are different in at least one aspect, which leads to differences between the first time series of states resulting from stage 615 and the second time series of states resulting from stage 625. These differences are analyzed by the simulation server 150 at stage 630. In some implementations, the simulation server 150 uses the differences to identify a value for a performance metric. For example, if the second time series of states represents an additional budget or advertising spend, then an increase in population that have been moved to a conversion or purchase state represents a return on the budget or advertising spend. That is, it represents a return on the investment ("ROI"). Other key performance indicators ("KPI") may similarly be assessed.

At stage 640, the simulation server 150 determines a second value for the performance metric by applying a subject model to one of either the first time series of states resulting from stage 615 or the second time series of states resulting from stage 625. For example, a media mix model ("MMM") purported to assess a return on investment ("ROI") may be applied to a time series of states generated with a particular budget or advertising spend. The value generated by application of the MMM to the time series can then be compared to valuation generated in stage 630. For example, the MMM may include a time series multivariate ordinary least square ("OLS") regression that can be applied to the generated time series of states. For a valid subject model, under the correct parameterization, the second value for the performance metric in stage 640 should be similar to the first value for the performance metric in stage 630.

At stage 650, the simulation server 150 validates the subject model by comparing the first value and the second value for the performance metric. In some implementations, the first and second values for the performance metric must be within a predefined range. In some implementations, the first and second values for the performance metric must be sufficiently similar, as determined by application of an acceptable error range or margin of error. In some implementations, this is represented by a score, e.g., a numerical value representing a quality of the subject model.

Given a fully specified scenario, the AMSS simulator is capable of producing observable data resulting from a random instance of that scenario. Ground truth is obtained empirically by generating multiple random instances of data. The ground truth $\theta$ may be a quantity such as the expected weekly sales resulting from the scenario. The AMSS simulator reports the ground truth with greater accuracy as the sample size, i.e., the number of datasets generated, grows. Larger samples are helpful for accurate estimation in scenarios with more variability.

In some implementations, these processes are used to report ground truth for quantities such as the return on ad spend in a media channel. For example, consider a scenario with a particular marketing strategy $b=(b_m)_{1:M}$, where $b_m$ is the budget for m-th media channel. For example, m=1 may represent television. To calculate the return on ad spend ("ROAS") for television, generate $N_1$ datasets $D_{n_1}(b)$; n1=1, : : : , N1. The ROAS $\theta$ may be empirically estimated using the following formula, wherein $x_{n_1}(b)$ is the total ad spend in dataset $D_{n_1}(b)$, $y_{n_1}(b)$ is the revenue, and b' represents the counterfactual scenario that is identical to b in all respects, except that no budget is assigned to television. (b'$_1$=0, and b'$_m$=b$_m$∀m≠1):

$$\hat{\theta} = \frac{1}{N_1 N_2} \sum_{n_1, n_2} \frac{y_{n_1}(b) - y_{n_2}(b')}{x_{n_1}(b) - x_{n_2}(b')}$$

By the law of large numbers, the ground truth reported by the simulator, $\hat{\theta}$, approaches the true ROAS, $\theta$. The accuracy of the approximation can be estimated by calculating a margin of error from the variability in the empirical sample.

In an example implementation, a simulation was run to generate ground truth for comparison to a linear regression model of the effect of media spend on sales. The model formula is:

$$y_t = \beta_0 + \beta_{tv} x_t^{(tv)} + \beta_{search} x_t^{(search)} + \beta_{season} x_t^{(season)} + \beta_{tv,season} x_t^{(tv)} x_t^{(season)} +$$
$$\beta_{search,season} x_t^{(search)} x_t^{(search)} + \beta_{tv,1/2} (x_t^{(tv)})^{1/2} + \beta_{tv,1/3} (x_t^{(tv)})^{1/3} + \epsilon_t$$

where $\epsilon_t \sim N(0, \sigma^2)$ for some $\sigma^2 \geq 0$

The media variables are the weekly spend in each media channel. This is a simplified representation of the data generating model, but produces reasonable results for illustrating analysis of return on ad spend ("ROAS") and marginal return on ad spend ("mROAS"). The following table shows the bias and mean squared error ("MSE") of estimates of ROAS and mROAS for media (e.g., television) and online (e.g., paid search) in the simplified model:

TABLE 4

| Metric | Media | | Online | |
| --- | --- | --- | --- | --- |
|  | ROAS | mROAS | ROAS | mROAS |
| bias | −0.16 | 0.05 | −0.10 | −0.00 |
| MSE | 0.15 | 0.05 | 0.14 | 0.09 |

Figure 7A:
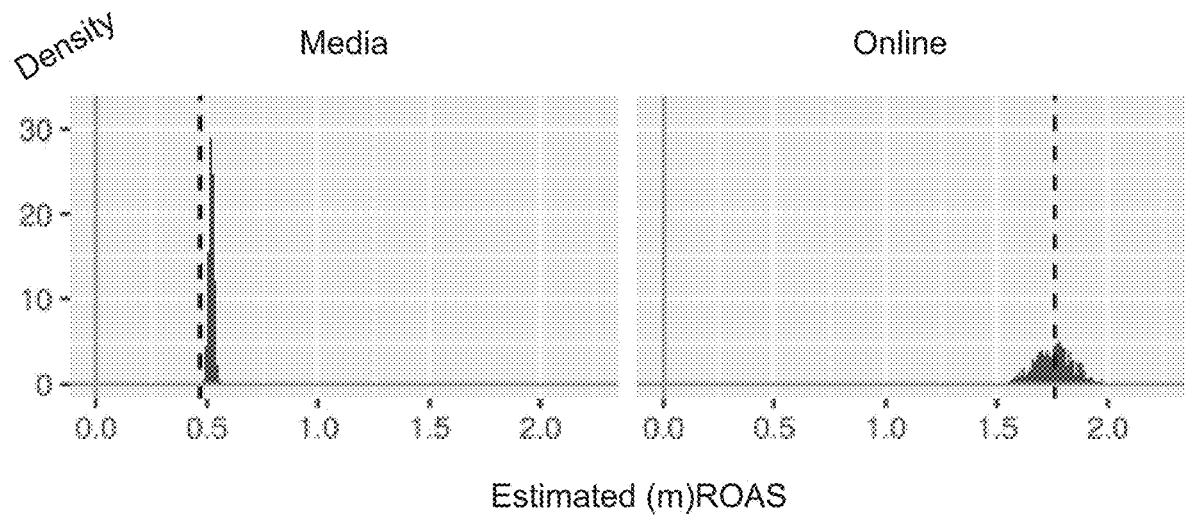
FIG. 7A and FIG. 7B are histograms of distribution of estimates or ROAS and mROAS for media channels from an example simulation.
Figure 7B:
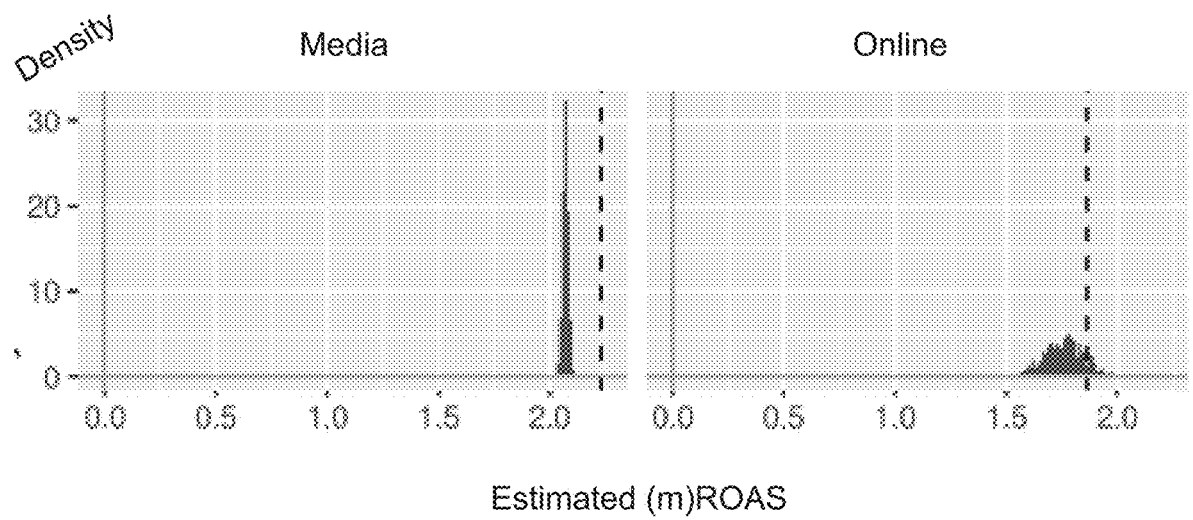

FIG. 7A and FIG. 7B are histograms illustrating distribution of estimates or ROAS and mROAS for each media channel in the example simulation. The model estimates of ROAS and mROAS may be compared to the ground truth generated by the simulation, with the bias and mean squared error ("MSE") as indicated in Table 4, above. There is a small amount of bias in the estimates of ROAS and mROAS for media, due to lack of model fit for the non-linear effect of television. FIG. 7A is a histogram for ROAS, and FIG. 7B is a histogram for mROAS. The histograms are of the regression estimates for ROAS and mROAS for media and online ads calculated over 1,000 datasets using basic linear regression. The values provided by simulation are plotted as vertical dashed lines.

Accordingly, described herein are systems and methods for model validation. In some implementations, in accordance with this description, a method includes generating a data set representative of a simulated population, the data set comprising a collection of membership counts corresponding to respective segments of the simulated population in accordance with a segmentation scheme; generating a first time series of segmentation states by processing the data set through a first simulation comprising iterative application of a first plurality of event functions including a first event function configured with a first parameter; generating a second time series of segmentation states by processing the data set through a second simulation comprising iterative application of a second plurality of event functions, wherein the second plurality of event functions does not include the first event function configured with the first parameter; identifying a first value for a performance metric, the first value representative of a difference between the first time series and the second time series; and identifying, for a subject model, a second value for the performance metric, the second value representative of an output from application of the subject model to one of the first time series or the second first time series. The method then determines, by comparison of the first value to the second value, a validity score for the subject model with respect to the performance metric.

In some implementations of the method the second plurality of event functions includes the first event function configured with a second parameter different from the first parameter. In some implementations of the method the second plurality of event functions does not include the first event function. In some implementations of the method the first plurality of event functions includes a natural migration event. In some implementations of the method the subject model is a media mix model. For example, the media mix model may include a time series multivariate ordinary least square ("OLS") regression. Some implementations of the method include generating the data set representative of the simulated population at random.

Some implementations include a non-transitory computer-readable memory storing instructions that, when executed by a processor, cause the processor to perform the method. In some implementations, a system includes memory storing such instructions and a processor configured to execute the instructions from the memory.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 102). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method for model validation, the method comprising:
generating a data set comprising a collection of membership counts corresponding to segments;
generating a first time series of states including a plurality of first membership counts corresponding to the segments at a plurality of points in time by processing the data set through a first simulation comprising application of a first plurality of functions including a first function configured with a first parameter, wherein processing the data set through the first simulation causes the collection of membership counts to change to one of the plurality of first membership counts at each of the plurality of points in time;
generating a second time series of states including a plurality of second membership counts corresponding to the segments at the plurality of points in time by processing the data set through a second simulation comprising application of a second plurality of functions, wherein the second plurality of functions does not include the first function configured with the first parameter, wherein processing the data set through the second simulation causes the collection of membership counts to change to one of the plurality of second membership counts at each of the plurality of points in time;
identifying a first value for a metric by analyzing differences in the plurality of first membership counts and the plurality of second membership counts;
identifying, for a subject model, a second value for the metric, the second value representative of an output from application of the subject model to one of the first time series or the second first time series; and
determining, by comparison of the first value to the second value, a score for the subject model.

2. The method of claim 1, wherein the second plurality of functions includes the first function configured with a second parameter different from the first parameter.

3. The method of claim 1, wherein the second plurality of functions does not include the first function.

4. The method of claim 1, wherein the first plurality of functions includes a natural migration event.

5. The method of claim 1, wherein the subject model is a media mix model.

6. The method of claim 5, wherein the media mix model includes a time series multivariate ordinary least square ("OLS") regression.

7. The method of claim 1, comprising generating the data set at random.

8. A system for model validation, the system comprising:
a computer-readable memory storing instructions; and
a processor configured to execute instructions from the memory to:
generate a data set comprising a collection of membership counts corresponding to segments;
generate a first time series of states including a plurality of first membership counts corresponding to the segments at a plurality of points in time by processing the data set through a first simulation comprising application of a first plurality of functions including a first function configured with a first parameter, wherein processing the data set through the first simulation causes the collection of membership counts to change to one of the plurality of first membership counts at each of the plurality of points in time;
generate a second time series of states including a plurality of second membership counts corresponding to the segments at the plurality of points in time by processing the data set through a second simulation comprising application of a second plurality of functions, wherein the second plurality of functions does not include the first function configured with the first parameter, wherein processing the data set through the second simulation causes the collection of membership counts to change to one of the plurality of second membership counts at each of the plurality of points in time;

identify a first value for a metric by analyzing differences in the plurality of first membership counts and the plurality of second membership counts; and identify, for a subject model, a second value for the metric, the second value representative of an output from application of the subject model to one of the first time series or the second first time series;

determine, by comparison of the first value to the second value, a score for the subject model.

9. The system of claim 8, wherein the second plurality of functions includes the first function configured with a second parameter different from the first parameter.

10. The system of claim 8, wherein the second plurality of functions does not include the first function.

11. The system of claim 8, wherein the first plurality of functions includes a natural migration event.

12. The system of claim 8, wherein the subject model is a media mix model.

13. The system of claim 12, wherein the media mix model includes a time series multivariate ordinary least square ("OLS") regression.

14. The system of claim 8, wherein the processor is configured to generate the data set at random.

15. A non-transitory computer-readable memory storing instructions that cause a processor executing the instructions to:

generate a data set comprising a collection of membership counts corresponding to segments;

generate a first time series of states including a plurality of first membership counts corresponding to the segments at a plurality of points in time by processing the data set through a first simulation with a first parameter, wherein processing the data set through the first simulation causes the collection of membership counts to change to one of the plurality of first membership counts at each of the plurality of points in time;

generate a second time series of states including a plurality of second membership counts corresponding to the segments at the plurality of points in time by processing the data set through a second simulation with a second parameter, wherein processing the data set through the second simulation causes the collection of membership counts to change to one of the plurality of second membership counts at each of the plurality of points in time;

identify a first value for a metric by analyzing differences in the plurality of first membership counts and the plurality of second membership counts; and identify, for a subject model, a second value for the metric, the second value representative of an output from application of the subject model to one of the first time series or the second first time series;

determine, by comparison of the first value to the second value, a score for the subject model.

16. The non-transitory computer-readable memory of claim 15, wherein the first simulation comprises applying a first plurality of functions and the second simulation comprises applying a second plurality of functions, wherein applying the first plurality of functions comprises applying a first function of the plurality of functions configured with the first parameter;

wherein the second plurality of functions includes the first function of the first plurality of functions configured with the second parameter, wherein the second parameter is different than the first parameter.

17. The non-transitory computer-readable memory of claim 15, wherein the first simulation comprises applying a first plurality of functions and the second simulation comprises applying a second plurality of functions, wherein applying the first plurality of functions comprises applying a first function of the plurality of functions configured with the first parameter;

wherein the second plurality of functions does not include the first function.

18. The non-transitory computer-readable memory of claim 16, wherein the first plurality of functions includes a natural migration event.

19. The non-transitory computer-readable memory of claim 15, wherein the subject model is a media mix model.

20. The non-transitory computer-readable memory of claim 15, wherein the processor is configured to generate the data set at random.

* * * * *